(12) United States Patent
Ohta et al.

(10) Patent No.: US 8,187,096 B2
(45) Date of Patent: May 29, 2012

(54) GAME APPARATUS AND GAME PROGRAM

(75) Inventors: Keizo Ohta, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1604 days.

(21) Appl. No.: 11/529,294

(22) Filed: Sep. 29, 2006

(65) Prior Publication Data

US 2007/0243931 A1    Oct. 18, 2007

(30) Foreign Application Priority Data

Apr. 14, 2006   (JP) ................................. 2006-112218

(51) Int. Cl.
*A63F 9/24* (2006.01)
(52) U.S. Cl. ........................................... 463/37; 463/47
(58) Field of Classification Search .......... 463/1, 36–38, 463/47; 345/156–158
See application file for complete search history.

(56) References Cited

U.S. PATENT DOCUMENTS

| | | | |
|---|---|---|---|
| 5,574,479 A | 11/1996 | Odell | |
| 5,627,565 A | 5/1997 | Morishita et al. | |
| 5,999,168 A | 12/1999 | Rosenberg et al. | |
| 6,072,467 A | 6/2000 | Walker | |
| 6,509,889 B2 * | 1/2003 | Kamper et al. | 345/157 |
| 6,982,697 B2 | 1/2006 | Wilson et al. | |
| 7,139,983 B2 | 11/2006 | Kelts | |
| 7,158,118 B2 | 1/2007 | Liberty | |
| 7,262,760 B2 | 8/2007 | Liberty | |
| 7,292,151 B2 | 11/2007 | Ferguson et al. | |
| 7,414,611 B2 | 8/2008 | Liberty | |

FOREIGN PATENT DOCUMENTS

| | | |
|---|---|---|
| JP | H10-214155 | 8/1998 |
| JP | 2000-308756 | 11/2000 |
| JP | 2001-159951 | 6/2001 |
| JP | 2003-47767 | 2/2003 |
| JP | 2003-320162 | 11/2003 |
| JP | 2006-68267 | 3/2006 |

OTHER PUBLICATIONS

European Search Report for EP 06 01 9758, search completed Dec. 22, 2006.
ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.
Pictures of Microsoft Xwand retrieved on May 13, 2009 from http://www.kf12.com/blogs/uploads/xwand.jpg and http://www.cs.cmu.edu/%7Edwilson/images/xwand.jpg.

(Continued)

*Primary Examiner* — David L Lewis
*Assistant Examiner* — Robert Mosser
(74) *Attorney, Agent, or Firm* — Nixon & Vanderhye P.C

(57) ABSTRACT

A game apparatus sequentially acquires acceleration data outputted by an acceleration sensor of an input device (step S2). Further, smoothed data representing a value which is obtained by smoothing an acceleration represented by the acceleration data is calculated (step S3). A game process is executed using the acceleration data and the smoothed data (step S4). For example, the game apparatus controls an action of an object appearing in a game space by using the acceleration data and the smoothed data.

29 Claims, 18 Drawing Sheets

OTHER PUBLICATIONS

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dll? ViewItem &item=350096666675&indexURL.

Japanese Office Action mailed May 2, 2011 in Japanese Application No. 2006-112218.

* cited by examiner

GAME APPARATUS AND GAME PROGRAM

CROSS REFERENCE OF RELATED APPLICATION

The disclosure of Japanese Patent Application No. 2006-112218, filed on Apr. 14, 2006, is incorporated herein by reference.

FIELD

The technology herein relates to a game apparatus and a game program, and more particularly, to a game apparatus and a game program for executing a game process based on an output from an acceleration sensor.

BACKGROUND AND SUMMARY

Japanese Laid-Open Patent Publication No. 2000-308756 (hereinafter, referred to as Patent Document 1) discloses an input control device having a multi-axis acceleration sensor and a multi-axis gyro sensor. The input control device, which has a rod-shaped body, causes the acceleration sensor to detect for an acceleration of the body and the gyro sensor to detect for a tilt and a rotation of the body. In other words, the input control device disclosed in Patent Document 1 detects for a movement of an input device held by a player with a hand using the acceleration sensor and detects for a rotation (attitude) of the input device using the gyro sensor. Thus, a plurality of sensors has been conventionally used to detect for multiple states of the input device such as a position, an attitude, and a movement thereof, and apply the multiple states of the input device to a game process.

Conventionally, it is necessary to use two types of sensors, i.e., an acceleration sensor and a gyro sensor, so as to detect for the multiple states of the input device, thereby increasing the size of the input device. Further, the input device having two types of sensors mounted thereon increases production cost.

Therefore, certain example embodiments provide a game apparatus and a game program for allowing multiple states of an input device to be applied to a game process in a simplified manner.

The reference numerals, supplementary description, and the like in the parentheses indicate the correspondence with the embodiment described below in order to aid in understanding certain example embodiments and are not intended to limit, in any way, the scope of the present invention.

A first aspect of certain example embodiments is directed to a game apparatus (3) for executing a game process using acceleration data (621) which is sequentially outputted by an acceleration sensor (37) of an input device (controller 7). The game apparatus comprises acquisition means (for example, the CPU 10 for executing step S2. Hereinafter, only step No. is described.), smoothing means (S3), and game process means (S4). The acquisition means sequentially acquires the acceleration data. The smoothing means sequentially calculates smoothed data (631) representing a value which is obtained by smoothing an acceleration represented by the acceleration data. The game process means executes the game process using the acceleration data and the smoothed data.

In a second aspect, the game process means may include first action control means (S11) and second action control means (S12). The first action control means determines, using the smoothed data, a state of a player object (51) in a game space for determining a first action to be performed by the player object. The second action control means determines, using the acceleration data, a state of the player object for determining a second action to be performed by the player object.

In a third aspect, the first action control means may determine an attitude of the player object in the game space using the smoothed data. At this time, the second action control means determines a position of the player object in the game space using the acceleration data.

In a fourth aspect, the second action control means may determine the position of the player object in the game space by determining a movement distance using the acceleration data, and by determining a moving direction in accordance with the attitude of the player object determined by the first action control means.

In a fifth aspect, the game process means may include difference calculation means (S12) and process execution means (S13 to S17). The difference calculation means calculates a difference (ay−by) between a value of the acceleration represented by the acceleration data and the value represented by the smoothed data. The process execution means executes the game process using the smoothed data and the difference.

In a sixth aspect, the game process means may include third action control means (S11) and fourth action control means (S12). The third action control means determines, using the smoothed data, a state of a player object in a game space for determining a third action to be performed by the player object. The fourth action control means determines, using the difference, a state of the player object for determining a fourth action to be performed by the player object.

In a seventh aspect, the third action control means may determine an attitude of the player object in the game space using the smoothed data. At this time, the fourth action control means determines a position of the player object in the game space using the difference.

In an eighth aspect, the fourth action control means may determine the position of the player object in the game space by determining a movement distance using the difference, and by determining a moving direction in accordance with the attitude of the player object determined by the third action control means.

In a ninth aspect, the game process means may include fifth action control means and sixth action control means. The fifth action control means controls, using the smoothed data, a state of a first player object appearing in the game space for determining an action to be performed by the first player object. The sixth action control means controls, using the difference, a state of a second player object appearing in the game space for determining an action to be performed by the second player object.

In a tenth aspect, the game process means may include seventh action control means and eighth action control means. The seventh action control means controls, using the smoothed data, a state of a first player object appearing in a game space for determining an action to be performed by the first player object. The eighth action control means controls, using the acceleration data, a state of a second player object appearing in the game space for determining an action to be performed by the second player object.

In an eleventh aspect, the smoothing means may calculate the smoothed data by calculating the smoothed data each time the acceleration data is acquired, and performing a calculation such that the value represented by the smoothed data having been most recently calculated approaches, at a predetermined rate, a value represented by the acceleration data having been acquired by the acquisition means (see FIG. 19).

In a twelfth aspect, the game process means may include tilt calculation means (S11), movement calculation means (S12), and process execution means (S11 to S17). The tilt calculation means calculates, using the smoothed data, first data (wing angle data 635) corresponding to a tilt of the input device including the acceleration sensor. The movement calculation means calculates, using the acceleration data, second data (object attitude data 632) corresponding to a movement of the input device. The process execution means executes the game process using the first data and the second data.

Further, certain example embodiments can be realized as a storage medium having stored thereon a game program for causing a computer of a game apparatus to execute the aforementioned operations.

According to the first aspect, the smoothing means calculates the smoothed data using the acquired acceleration data. Although the acceleration data and the smoothed data each represents a state of the input device such as a position, an attitude, and a movement, the state represented by the acceleration data is different from the state represented by the smoothed data. Therefore, according to the first aspect, by calculating the smoothed data, information indicating two types of states of the input device can be acquired from an output of one acceleration sensor. The game process is executed using two kinds of data, i.e., the acceleration data and the smoothed data, and therefore multiple states of the input device can be utilized for the game process. Further, only one type of sensor, that is, the acceleration sensor is used for the first aspect, and therefore a structure of the input device can be simplified as compared to a conventional art. That is, according to the first aspect, the multiple states of the input device can be utilized for the game process in a simplified manner.

According to the second aspect, the first action control means causes an object to perform the first action using the acceleration data, and the second action control means causes the object to perform the second action using the smoothed data. That is, the game apparatus causes one object to simultaneously perform two types of actions by using two kinds of data obtained from the output by the acceleration sensor. Thus, a player can cause one object to perform two types of actions by performing a simplified operation of moving the input device. That is, the player can cause the object to perform various actions in a simplified operation method, thereby improving controllability of the game.

According to the third aspect, the attitude of the object is determined using the smoothed data and the position of the object is determined using the acceleration data. Thus, the player can control the attitude and the position of the object by performing a simplified operation of moving the input device, whereby the player can cause the object to perform various actions in a simplified operation.

According to the fourth aspect, the position of the object is determined using not only the acceleration data but also the smoothed data. Thus, the position of the object is determined using two kinds of data, thereby controlling the position of the object with enhanced precision.

According to the fifth aspect, the difference between the value of the acceleration represented by the acceleration data and the value represented by the smoothed data is calculated so as to execute the game process using the difference and the smoothed data. The difference represents only a component representing a vigorous movement of the input device, and therefore the game apparatus can calculate the vigorous movement of the input device with enhanced accuracy by calculating the difference.

According to the sixth aspect, the third action control means causes an object to perform the third action using the smoothed data, and the fourth action control means causes the object to perform the fourth action using the difference. That is, the game apparatus causes one object to simultaneously perform two types of actions by using two kinds of data obtained from the output by the acceleration sensor. Thus, a player can cause one object to perform two types of actions by performing a simplified operation of moving the input device. That is, the player can cause the object to perform various actions in a simplified operation method, thereby improving controllability of the game.

According to the seventh aspect, the attitude of the object is determined using the smoothed data and the position of the object is determined using the difference. Thus, the player can control the attitude and the position of the object by performing a simplified operation of moving the input device, whereby the player can cause the object to perform various actions in a simplified operation.

According to the eighth aspect, the position of the object is determined using not only the difference but also the smoothed data. Thus, the position of the object is determined using two kinds of data, thereby controlling the position of the object with enhanced precision.

According to the ninth aspect, the fifth action control means controls the action of the first player object using the smoothed data, and the sixth action control means controls the action of the second object using the difference. That is, the game apparatus simultaneously controls the actions of two different objects by using two kinds of data obtained from the output by the acceleration sensor. Thus, a player can simultaneously control two objects by performing a simplified operation of moving the input device. That is, the player can controls a plurality of objects in a simplified operation method, thereby improving controllability of the game.

According to the tenth aspect, the seventh action control means controls the action of the first object using the smoothed data, and the eighth action control means controls the action of the second object using the acceleration data. That is, the game apparatus simultaneously controls the actions of two different objects by using two kinds of data obtained from the output by the acceleration sensor. Thus, a player can simultaneously control two objects by performing a simplified operation of moving the input device. That is, the player can control a plurality of objects in a simplified operation method, thereby improving controllability of the game.

According to the eleventh aspect, the smoothing means performs the smoothing process using the smoothed data having been most recently calculated and the acceleration data having been currently acquired. That is, the smoothed data can be calculated by using only data having been already acquired when the smoothing process is performed. Therefore, the smoothed data can be calculated in real time, thereby realizing rapid response game operation.

According to the twelfth aspect, the game apparatus calculates the tilt of the input device using the smoothed data and calculates the movement of the input device using the acceleration data. Therefore, the game apparatus can acquire, from one sensor, two kinds of states, that is, the tilt and the movement of the input device. That is, the game apparatus can simultaneously detect for the tilt and the movement of the input device.

These and other objects, features, aspects and advantages of certain example embodiments will become more apparent from the following detailed description when taken in conjunction with the accompanying drawings.

DESCRIPTION OF THE PREFERRED EMBODIMENTS

Figure 1:
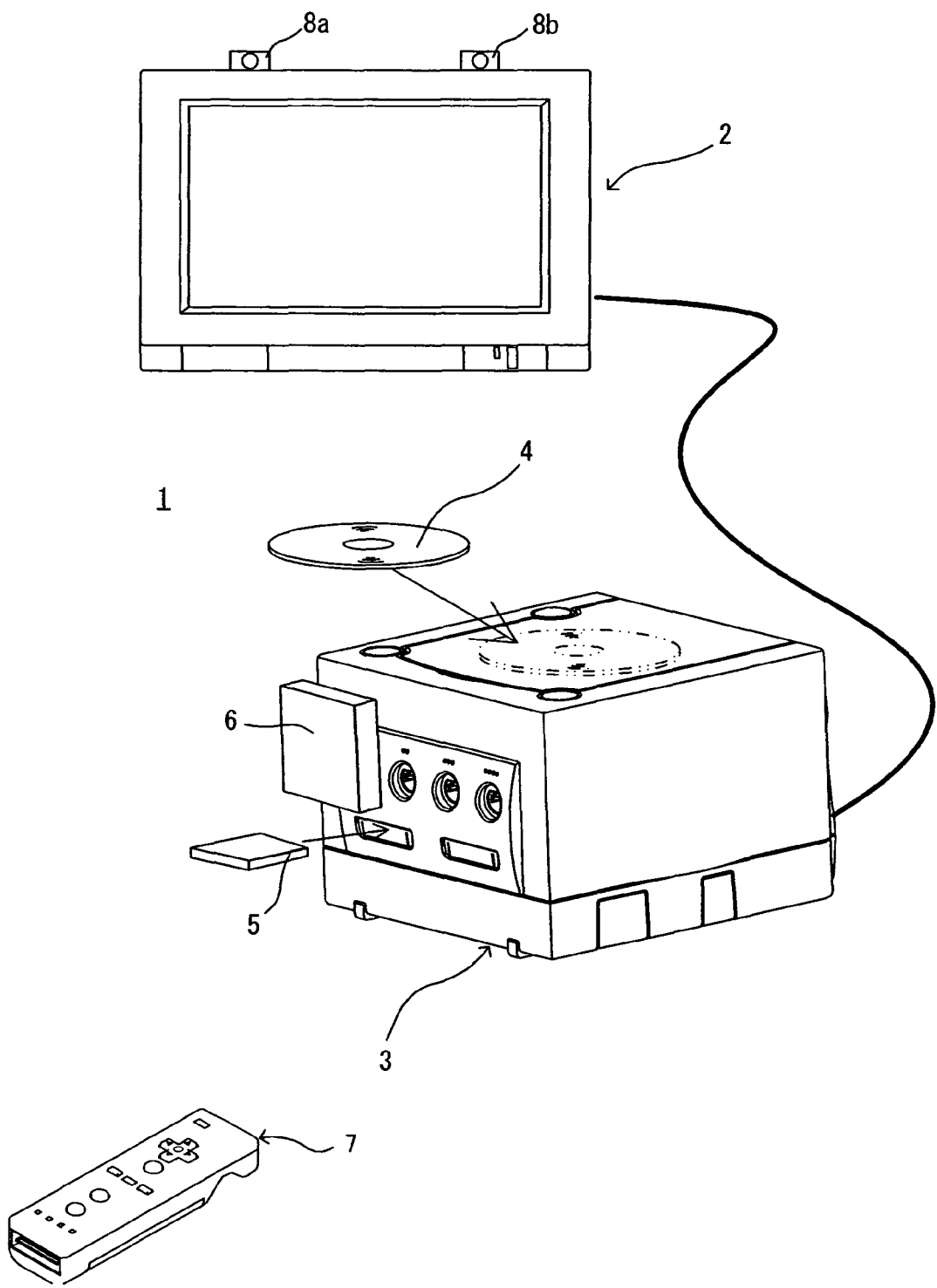
FIG. 1 is an external view illustrating a game system including a game apparatus according to an embodiment.

With reference to FIG. 1, a game system 1 including a game apparatus according to one embodiment will be described. FIG. 1 is an external view illustrating the game system 1. Hereinafter, the game apparatus and the game program of the present invention will be described. In the following description, the game apparatus includes a stationary game apparatus.

As shown in FIG. 1, the game system 1 includes a stationary game apparatus (hereinafter, referred to simply as a "game apparatus") 3, which is connected to a display (hereinafter, referred to as a "monitor") 2 of a home-use television receiver or the like having a speaker via a connection cord, and a controller 7 for giving operation data to the game apparatus 3. Two markers 8a and 8b are provided in the vicinity of the monitor 2 (on the top of a screen in FIG. 1). Specifically, the markers 8a and 8b are infrared LEDs, each of which outputs an infrared light forward from the monitor 2. The game apparatus 3 is connected to a receiving unit 6 via a connection terminal. The receiving unit 6 receives the operation data which is wirelessly transmitted from the controller 7. The controller 7 and the game apparatus 3 are connected to each other by wireless communication. In another embodiment, the controller 7 and the game apparatus 3 may be connected to each other by wire. On the game apparatus 3, an optical disc 4 typifying an exchangeable information storage medium is detachably mounted. The game apparatus 3 includes a power ON/OFF switch, a game process reset switch, and an OPEN switch for opening a top lid of the game apparatus 3 on a top main surface of the game apparatus 3. When a player presses the OPEN switch, the lid is opened, so that the optical disc 4 can be mounted or dismounted.

Further, on the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored in the external memory card 5 and display the game image on the monitor 2. A player playing with the game apparatus 3 can enjoy the game by operating the controller 7 while watching the game image displayed on the monitor 2.

The controller 7 wirelessly transmits the operation data from a communication section 36 included therein (described later) to the game apparatus 3 connected to the receiving unit 6, using the technology of, for example, Bluetooth (registered trademark). The controller 7 includes an operation section of a plurality of operation buttons. As described later in detail, the controller 7 includes an acceleration sensor 37 (described below) for detecting for a linear acceleration. Data representing an acceleration detected by the acceleration sensor 37 is transmitted to the game apparatus 3 as a portion of the operation data. The game apparatus 3 can calculate a tilt (attitude) and a movement of the controller 7 using the data representing the acceleration, and execute a process based on the tilt and the movement as necessary. Further, the controller 7 includes an imaging information calculation section 35 (described below) for taking an image as seen from the controller 7. The imaging information calculation section 35 takes, as imaging subjects, images of the respective markers 8a and 8b disposed in the vicinity of the monitor 2. The game apparatus 3 performs a calculation using the image, whereby the game apparatus 3 can execute a process based on a position and an attitude of the controller 7.

Figure 2:
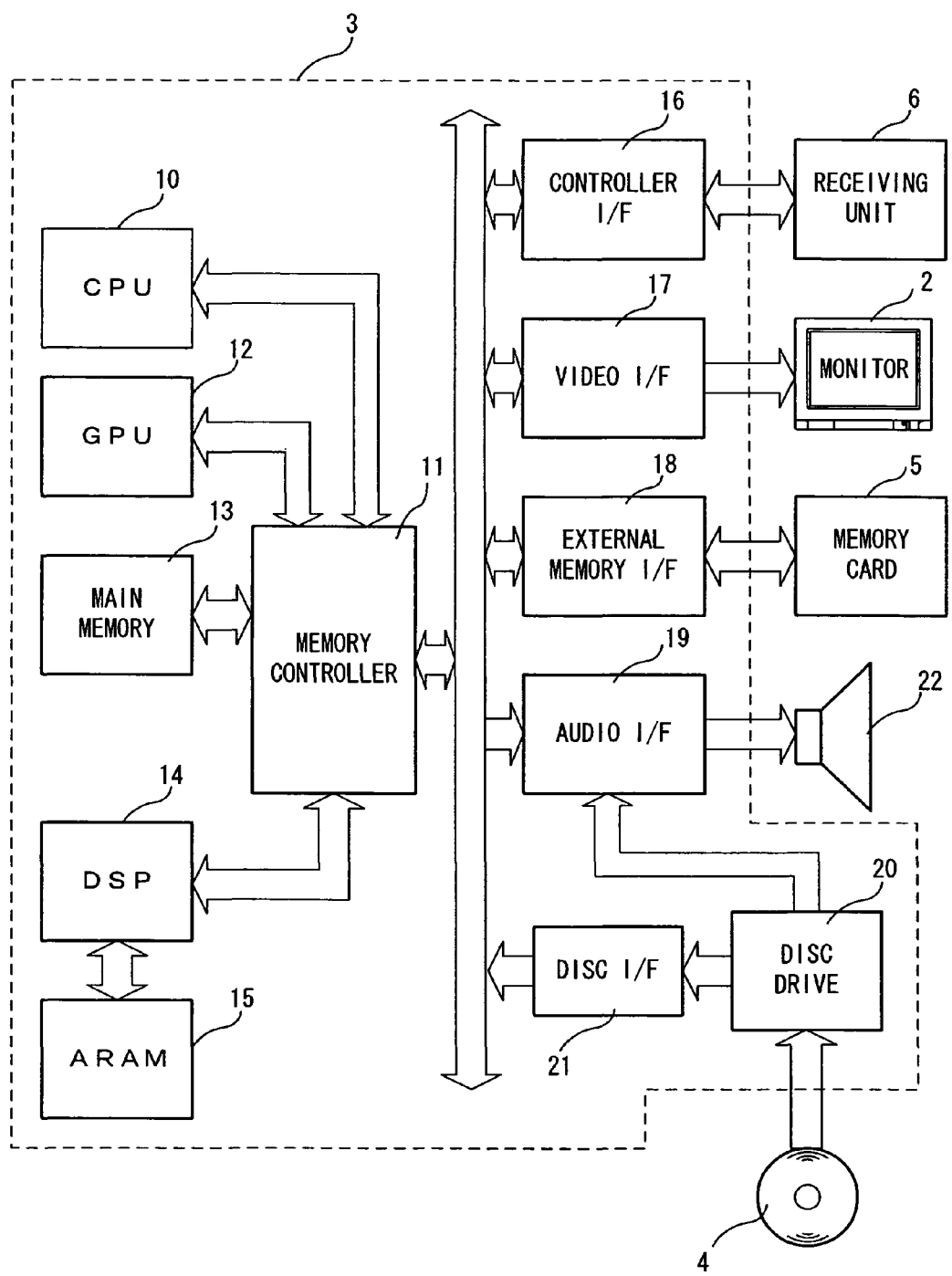
FIG. 2 is a functional block diagram of a game apparatus 3 shown in FIG. 1.

Next, with reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 10 for executing various types of programs. The CPU 10 executes a boot program stored in a boot ROM (not shown) to, for example, initialize memories including a main memory 13, and then executes a game program stored on the optical disc 4 to perform game process or the like in accordance with the game program. The CPU 10 is connected to a GPU (Graphics Processing Unit) 12, the main memory 13, a DSP (Digital Signal Processor) 14, and an ARAM (audio RAM) 15 via a memory controller 11. The memory controller 11 is connected to a controller I/F (interface) 16, a video I/F 17, an external memory I/F 18, an audio I/F 19, and a disc I/F 21 via a predetermined bus. The controller I/F 16, the video I/F 17, the external memory I/F 18, the audio I/F 19 and the disc I/F 21 are connected to the receiving unit 6, the monitor 2, the external memory card 5, the speaker 22, and a disc drive 20, respectively.

The GPU 12 performs image processing based on an instruction from the CPU 10. The GPU 12 includes, for example, a semiconductor chip for performing calculation processing necessary for displaying 3D graphics. The GPU 12 performs the image processing using a memory (not shown) dedicated for image processing and a part of the storage area of the main memory 13. The GPU 12 generates game image data and a movie to be displayed on the monitor 2 using such memories, and outputs the generated data or movie to the monitor 2 via the memory controller 11 and the video I/F 17 as necessary.

The main memory 13 is a storage area used by the CPU 10, and stores a game program or the like necessary for processing performed by the CPU 10 as necessary. For example, the main memory 13 stores a game program read from the optical disc 4 by the CPU 10, various types of data or the like. The game program, the various types of data or the like stored in the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs a predetermined process (for example, storage of the game program or sound data already read). The DSP 14 reads the sound data stored in the ARAM 15, and outputs the sound data to the speaker 22 included in the monitor 2 via the memory controller 11 and the audio I/F 19.

The memory controller 11 comprehensively controls data transmission, and is connected to the various I/Fs described above. The controller I/F 16 includes, for example, four controller I/Fs, and communicably connects the game apparatus 3 to an external device which is engageable via connectors of the controller I/Fs. For example, the receiving unit 6 is engaged with such a connector and is connected to the game apparatus 3 via the controller I/F 16. As described above, the receiving unit 6 receives the operation data from the controller 7 and outputs the operation data to the CPU 10 via the controller I/F 16. In another embodiment, the game apparatus 3 may include a receiving module for receiving the operation data transmitted by the controller 7, instead of the receiving unit 6. In this case, the operation data received by the receiving module is outputted to the CPU 10 via a predetermined bus. The video I/F 17 is connected to the monitor 2. The external memory I/F 18 is connected to the external memory card 5 and is accessible to a backup memory or the like provided in the external memory card 5. The audio I/F 19 is connected to the speaker 22 built in the monitor 2 such that the sound data read by the DSP 14 from the ARAM 15 or sound data directly outputted from the disc drive 20 can be outputted from the speaker 22. The disc I/F 21 is connected to the disc drive 20. The disc drive 20 reads data stored at a predetermined reading position of the optical disc 4 and outputs the data to a bus of the game apparatus 3 or the audio I/F 19.

Figure 3A:
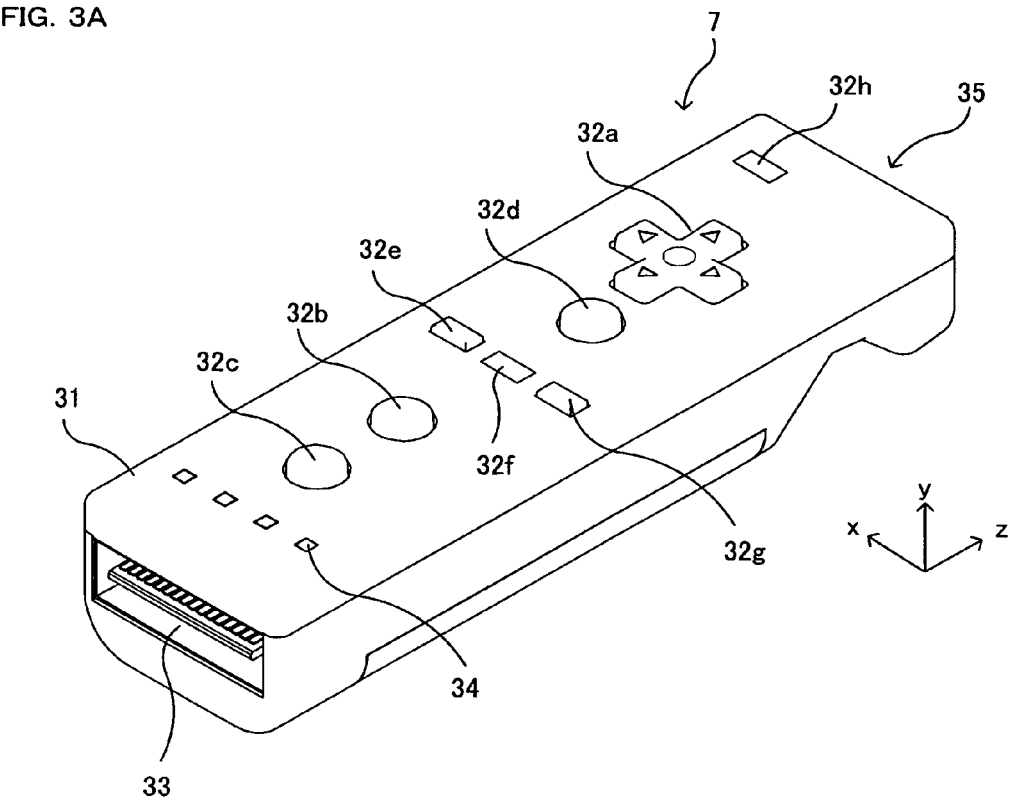
FIG. 3A is a perspective view of a controller 7.
Figure 3B:
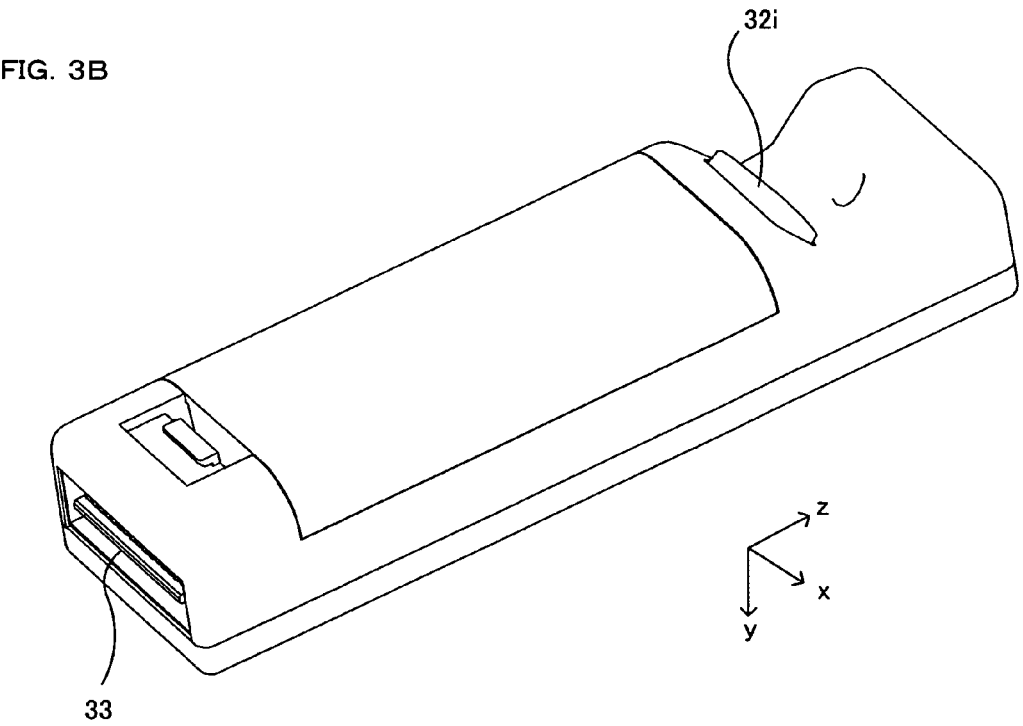
FIG. 3B is a perspective view of the controller 7.
Figure 4:
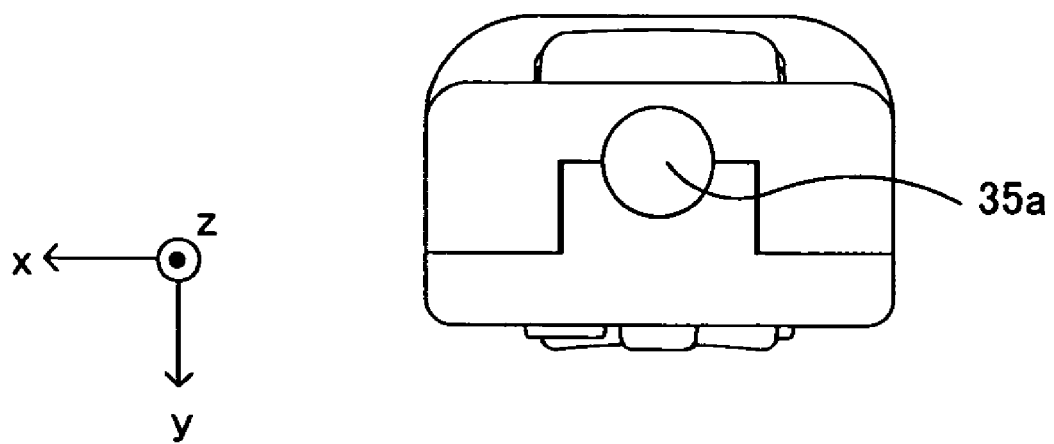
FIG. 4 is a view of the controller 7 as seen from the front side thereof.

Next, with reference to FIGS. 3 and 8, the controller 7 will be described. FIGS. 3 and 4 are perspective views each illustrating an outer appearance of the controller 7. FIG. 3A is a perspective view of the controller 7 as seen from the top rear side thereof. FIG. 3B is a perspective view of the controller 7 as seen from the bottom rear side thereof. FIG. 4 is a view of the controller 7 as seen from the front side thereof.

As shown in FIGS. 3A, 3B, and 4, the controller 7 includes the housing 31 formed by plastic molding or the like. The housing 31 has a generally parallelepiped shape extending in a longitudinal direction (z axis direction in FIG. 3) from front to rear. The overall size of the housing 31 is small enough to be held by one hand of an adult or even a child. The player uses the controller 7 to press buttons provided thereon, change a tilt (an angle with respect to the direction of gravity) of the controller 7, and change a position or a direction of the controller 7, thereby performing a game operation. For example, the player can change the tilt of the controller 7 or moves the controller 7 (for example, shakes the controller 7 up and down) so as to perform an operation on a subject to be operated in a game space. Further, for example, the player may rotate the controller 7 about the longitudinal axis thereof, or change a position, on a screen, designated by the controller 7, so as to perform an operation on the subject to be operated. Here, "the position, on a screen, designated by the controller 7" is preferably a position at which a straight line extending from the front edge portion of the controller 7 in the longitudinal direction thereof intersects with the screen of the monitor 2. However, "the position, on a screen, designated by the controller 7" may not exactly fall on the aforementioned position. The game apparatus 3 may calculate, as "the position, on a screen, designated by the controller 7", a position near the position at which the straight line intersects with the screen of the monitor 2. Hereinafter, "the position, on a screen, designated by the controller 7" is referred to as "a position designated by the controller 7". The longitudinal direction of the controller 7 (housing 31) may be referred to as "a direction designated by the controller 7".

The housing 31 has a plurality of operation keys. On the top surface of the housing 31, a cross key 32a, an X button 32b, a Y button 32c, an A button 32d, a select switch 32e, a menu switch 32f, and a start switch 32g are provided. On a bottom surface of the housing 31, a recessed portion is formed. On a rear slope surface of the recessed portion, a B button 32i is provided. The respective operation keys (buttons) are assigned with functions, respectively, in accordance with the game program executed by the game apparatus 3, but this will not be described in detail because the functions are not directly relevant to this embodiment. On the top surface of the housing 31, a power supply switch 32h is provided which remotely causes the game apparatus 3 to be powered on/off.

Figure 5A:
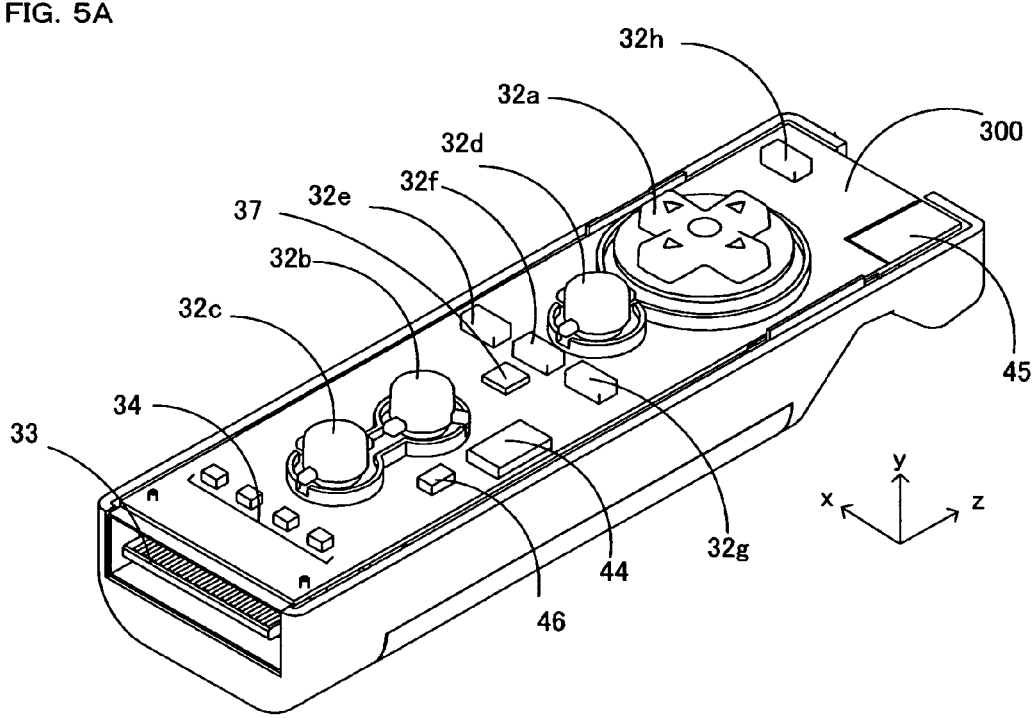
FIG. 5A is a diagram illustrating an internal structure of the controller 7.
Figure 5B:
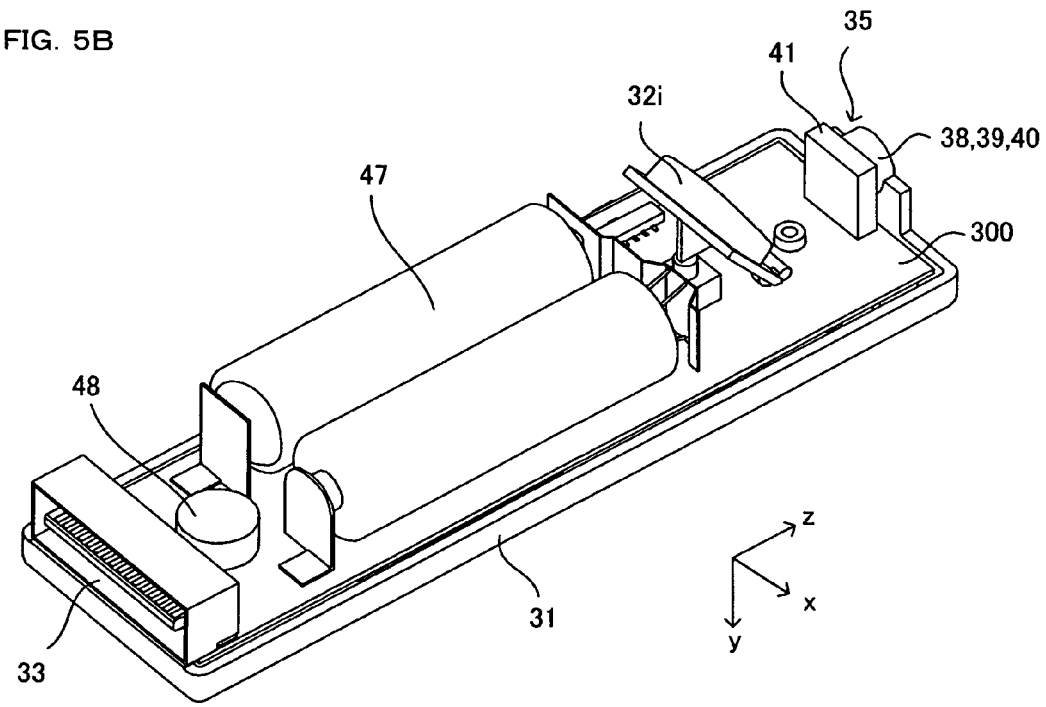
FIG. 5B is a diagram illustrating the internal structure of the controller 7.

The controller 7 includes the imaging information calculation section 35 as shown in FIG. 5B. As shown in FIG. 4, on the front surface of the housing 31, a light entrance 35a of the imaging information calculation section 35 is provided. On the rear surface of the housing 31, a connector 33 is provided. The connector 33 is, for example, a 32-pin edge connector for connecting the controller 7 to another device. On the top rear side of the housing 31, a plurality of LEDs 34 are provided. The controller 7 is assigned to a controller type (number) so as to be distinguishable from other controllers 7. The LEDs 34 are used for informing the player of the controller type which is currently set to controller 7 that he or she is using. Specifically, when the controller 7 transmits the operation data to the game apparatus 3, one of the plurality of LEDs 34 corresponding to the controller type is lit up.

With reference to FIGS. 5A and 5B, an internal structure of the controller 7 will be described. FIGS. 5A and 5B are diagrams each illustrating an internal structure of the controller 7. FIG. 5A is a perspective view illustrating a state where an upper casing (a part of the housing 31) of the controller 7 is removed. FIG. 5B is a perspective view illustrating a state where a lower casing (a part of the housing 31) of the controller 7 is removed. Further, FIG. 5B is a perspective view illustrating a reverse side of a substrate 300 shown in FIG. 5A.

As shown in FIG. 5A, the substrate 300 is fixed inside the housing 31. On the top main surface of the substrate 300, operation keys 32a, 32b, 32c, 32d, 32e, 32f, 32g, and 32h, an acceleration sensor 37, the LEDs 34, a quartz oscillator 46, a wireless module 44, an antenna 45 and the like are provided. These elements are connected to a micro computer 42 (see FIG. 6) via lines (not shown) formed on the substrate 300 and the like. The wireless module 44 and the antenna 45 allow the controller 7 to act as a wireless controller. The quartz oscillator 46 generates a reference clock of the micro computer 42 described below.

As shown in FIG. 5B, at the front edge of the bottom main surface of the substrate 300, the imaging information calculation section 35 is provided. The imaging information calculation section 35 includes an infrared filter 38, a lens 39, an image pickup element 40 and an image processing circuit 41 located in this order from the front surface of the controller 7 on the bottom main surface of the substrate 300. At the rear edge of the bottom main surface of the substrate 300, the connector 33 is attached. The B button 32i is attached on the bottom main surface of the substrate 300 behind the imaging information calculation section 35, and cells 47 are accommodated behind the B button 32i. On the bottom main surface of the substrate 300 between the cells 47 and the connector 33, a vibrator 48 is attached. The vibrator 48 may be, for example, a vibration motor or a solenoid. The controller 7 is vibrated by an actuation of the vibrator 48, and the vibration is conveyed to the player's hand holding the controller 7. Thus, a so-called vibration-feedback game can be realized.

The shape of the controller 7, and the shape, the number and the setting position of each of the operation keys, as shown in FIGS. 3A, 3B, 4, 5A, and 5B, are merely examples. Needless to say, when the shape, the number, the setting position and the like of each of the controller 7 and the operation keys are different from those described in the present embodiment, other embodiments can be realized. Further, the imaging information calculation section 35 (light entrance 35a of the imaging information calculation section 35) of the controller 7 may not be positioned on the front surface of the housing 31. The imaging information calculation section 35 may be provided on another surface at which light can be received from the exterior of the housing 31. At this time, the "direction designated by the controller 7" is perpendicular to the light entrance, that is, the "direction designated by the controller 7" represents the imaging direction of the image pickup element 40.

Figure 6:
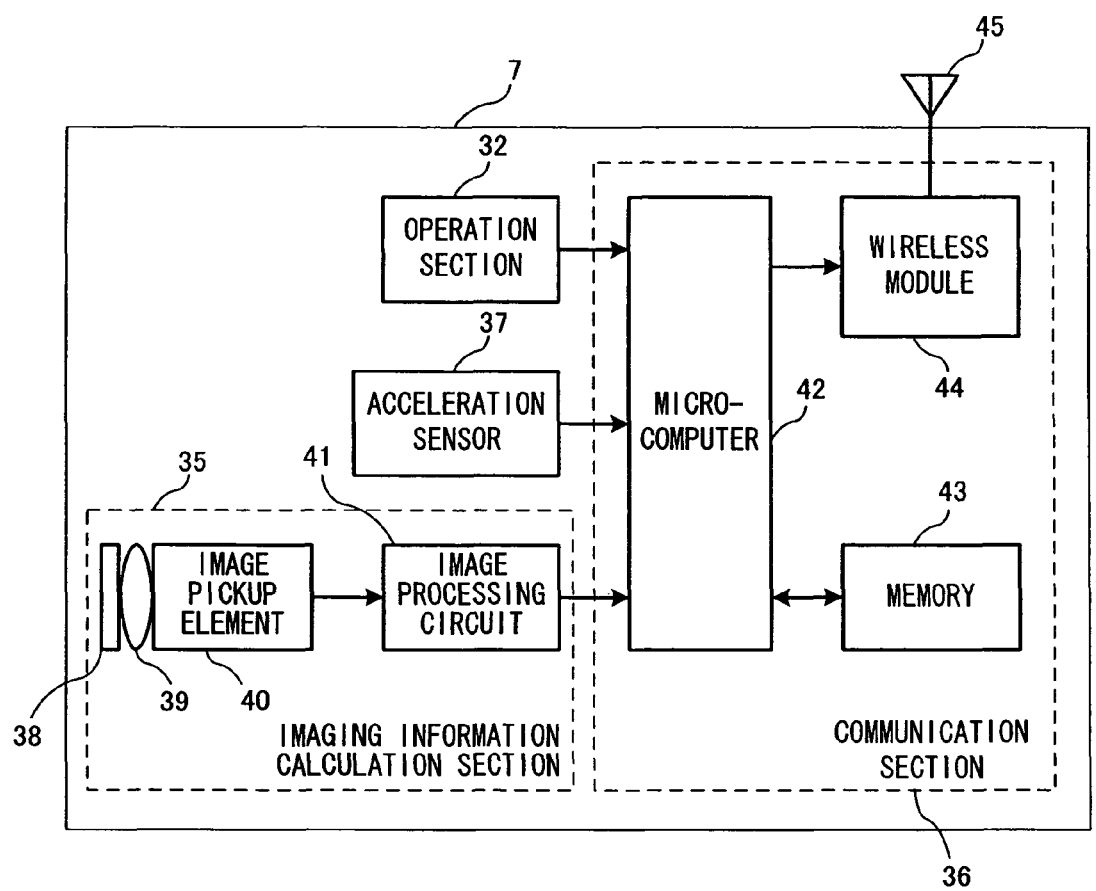
FIG. 6 is a block diagram illustrating a structure of the controller 7.

FIG. 6 is a block diagram illustrating a structure of the controller 7. The controller 7 includes the operation section 32 (the respective operation keys), the imaging information calculation section 35, the communication section 36, and the acceleration sensor 37. Although in the present embodiment the controller 7 needs to have an acceleration detection means (acceleration sensor 37), the operation section 32 and the imaging information calculation section 35 may be eliminated from the controller 7.

The acceleration sensor 37 detects for accelerations, including the gravitational acceleration, of the controller 7. That is, the acceleration sensor 37 detects forces, including the gravitational force, applied to the controller 7. The acceleration sensor 37 detects linear acceleration(s) along the sensing axis direction(s) among accelerations applied to a detection section of the acceleration sensor 37. For example, a two-axis or three-axis acceleration sensor detects the accelerations (linear accelerations) of components along the respective axes, as the accelerations applied to the detection section of the acceleration sensor. For example, the two-axis or three-axis acceleration sensor 37 may be of the type available from Analog Devices, Inc. or STMicroelectronics N.V.

In the present embodiment, the acceleration sensor 37 detects for linear accelerations in the three axial directions, i.e., the up/down direction (y-axis direction shown in FIGS. 3A and 3B), the left/right direction (x-axis direction shown in FIGS. 3A and 3B), and the forward/backward direction (z-axis direction shown in FIGS. 3A and 3B) of the controller 7. Since the acceleration sensor 37 detects a linear acceleration along each of the axes, an output from the acceleration sensor 37 represents a value of the linear acceleration along each of the three axes. The detected acceleration is represented as a three-dimensional vector based on a xyz coordinate system set for the controller 7. Hereinafter, a vector which has components of accelerations of the respective axes and which has been detected by the acceleration sensor 37 is referred to as an acceleration vector.

Figure 7:
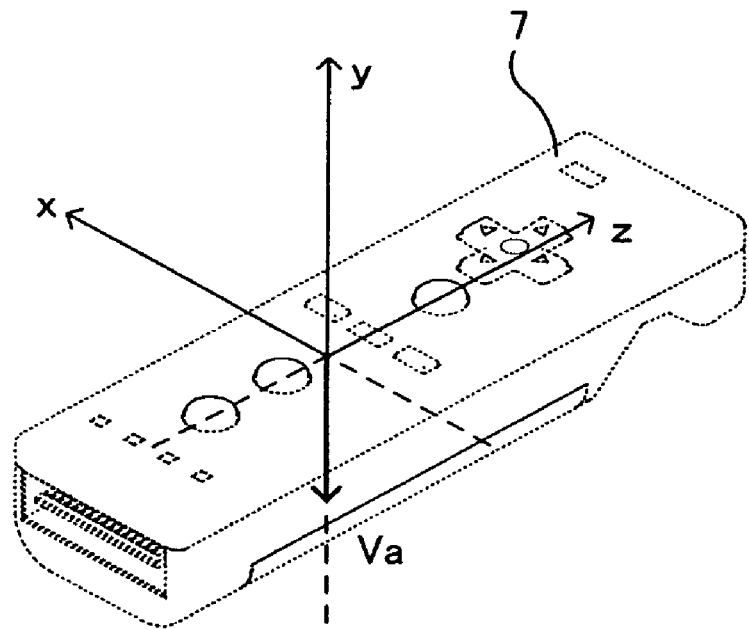
FIG. 7 is a diagram illustrating a relationship between a tilt of the controller 7 and an output from an acceleration sensor.
Figure 8:
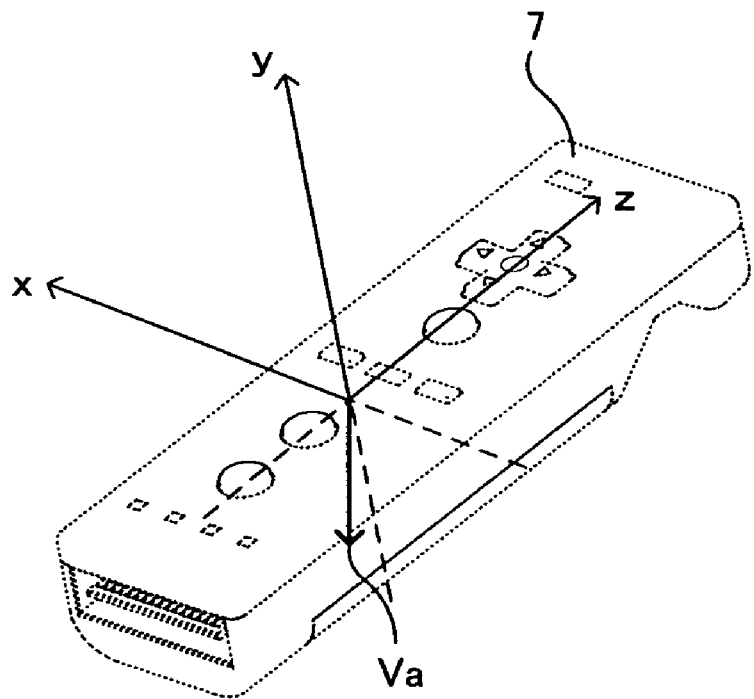
FIG. 8 is a diagram illustrating a relationship between a tilt of the controller 7 and an output from the acceleration sensor.

FIGS. 7 and 8 are diagrams each illustrating a relationship between a tilt of the controller 7 and an output from the acceleration sensor. FIG. 7 shows a state where the gravitational acceleration (vector Va shown in FIG. 7) is applied to the controller 7 having its bottom main surface oriented downward. In FIGS. 7 and 8, the controller 7 is not moving. When the acceleration sensor 37 is not moving, the gravitational force (gravitational acceleration) is constantly applied to the controller 7, whereby the acceleration vector Va represents only the gravitational acceleration. For example, in the state shown in FIG. 7, the acceleration vector Va has a negative direction along the y-axis. That is, the gravitational acceleration of 1G is applied to the y-axis of the acceleration sensor 37, and the accelerations along the x-axis and z-axis are almost zero. FIG. 8 shows a state where the controller 7 is rotated about the z-axis so as to be tilted from the position shown in FIG. 7. In the state shown in FIG. 8, the direction of the acceleration vector Va is changed from the direction shown in FIG. 7, and an x-coordinate value and a y-coordinate value of the acceleration vector Va are other than zero, and a z-coordinate value remains zero since the controller 7 is rotated about the z-axis. Thus, the direction of the acceleration vector detected by the acceleration sensor 37 is changed depending on the attitude of the controller 7, and therefore the acceleration vector is used to calculate the tilt (attitude) of the controller 7.

Data (acceleration data) representing the acceleration (acceleration vector) detected by the acceleration sensor 37 is outputted to the communication section 36. In the present embodiment, the communication section 36 of the controller 7 sequentially outputs the acceleration data to the game apparatus 3, for example, for each frame. The game apparatus 3 calculates the tilt (attitude) and the movement of the controller 7 using the acceleration data so as to perform a game process in accordance with the tilt and the movement. The acceleration sensor 37 detects an acceleration having a linear component along each axis, and therefore the game apparatus 3 cannot directly detect the tilt of the controller 7. Accordingly, a tilt of a device incorporating the acceleration sensor 37 is calculated by subjecting an acceleration detected for each axis of the acceleration sensor to a predetermined calculation.

In the present embodiment, the acceleration sensor 37 sets, to one, a magnitude of an acceleration of the controller 7 which is not moving. In other words, when the acceleration detected by the acceleration sensor 37 is only the gravitational acceleration, the magnitude of the acceleration is set to one. For example, as values of the respective components of the acceleration vector Va detected in the state shown in FIG. 7, (x, y, z)=(0, −1, 0) is satisfied.

Returning to FIG. 6, the imaging information calculation section 35 is a system for analyzing data of an image taken by an image pickup means, determining an area having a high brightness included in the taken image, and calculating the centroid and a size of the area. The imaging information calculation section 35, which has, for example, a maximum sampling cycle of about 200 frame/second, can follow and analyze a relatively fast movement of the controller 7.

The imaging information calculation section 35 includes the infrared filter 38, the lens 39, the image pickup element 40, and the image processing circuit 41. The infrared filter 38 allows only infrared lights to pass therethrough, among lights incident on the front surface of the controller 7. The markers 8a and 8b disposed in the vicinity of the display screen of the monitor 2 are infrared LEDs each of which outputs an infrared light forward from the monitor 2. Therefore, when the infrared filter 38 is provided, images of the markers 8a and 8b can be taken with enhanced accuracy. The lens 39 collects the infrared lights which have passed through the infrared filter 38 and outputs the infrared lights to the image pickup element 40. The image pickup element 40 is a solid-state image pickup device such as, for example, a CMOS sensor or a CCD. The image pickup element 40 takes images of the infrared lights collected by the lens 39. Accordingly, the image pickup element 40 takes images of only the infrared lights which have passed through the infrared filter 38 and generates image data. Hereinafter, the image taken by the image pickup element 40 is referred to as "taken image". The image data generated by the image pickup element 40 is processed by the image processing circuit 41. The image processing circuit 41 calculates positions of the imaging subjects (markers 8a and 8b) in the taken image.

When receiving the taken image, the image processing circuit 41 calculates coordinates representing a position of an area, in the taken image, which satisfies a predetermined condition, for each area. The predetermined condition is a criterion used for identifying an image (subject image) of the imaging subject. Specifically, when a brightness of the area has a value greater than a predetermined value and the size of the area has a value smaller than a predetermined value, the predetermined condition is satisfied. Here, the area of a brightness having a value greater than the predetermined value is referred to as a "high brightness area". As the predetermined condition, any criterion which enables identification of the imaging subject can be used. In another embodiment, a color of the image can be used for the predetermined condition.

When calculating a position of the subject image, the image processing circuit 41 initially identifies, as a candidate of the subject image, the high brightness area in the taken image. The subject image appears as the high brightness area in the image data of the taken image. Next, the image processing circuit 41 determines whether or not the identified high brightness area is the subject image, based on the size of the identified high brightness area. The taken image may contain images, such as images of sunlight from a window, and a light of a fluorescent lamp in a room, other than the subject images representing the two markers 8a and 8b. In this case, the images other than the images of the markers 8a and 8b may be also identified as the high brightness area. In the aforementioned determination process, the subject images representing the markers 8a and 8b are distinguished from other images so as to accurately identify the subject images. Specifically, it is determined whether or not the identified high brightness area has a size smaller than a predetermined size. When the high brightness area has s size smaller than the predetermined size, the high brightness area is determined as the subject image. When the high brightness area does not have a size smaller than the predetermined size, the high brightness area is determined as an image other than the subject image.

Further, the image processing circuit 41 calculates a position of the high brightness area determined as the subject image. Specifically, the centroid of the high brightness area is calculated. The centroid can be calculated using a scale corresponding to a resolution higher than that of the image pickup element 40. For example, when the image pickup element 40 takes an image with a resolution of 126×96, the centroid can be calculated using a scale corresponding to a resolution of 1024×768. The coordinates of the centroid are represented using integers between (0, 0) and (1024, 768).

As described above, the image processing circuit 41 calculates, for each area, coordinates representing the position of the area, in the taken image, which satisfies the predetermined condition. The image processing circuit 41 outputs data representing the calculated coordinates to the micro computer 42 of the communication section 36. The micro computer 42 transmits the data representing the coordinates to the game apparatus 3 as the operation data. The value of the coordinates is changed in accordance with the direction (attitude) and the position of the controller 7, and therefore the game apparatus 3 can calculate the direction and the position of the controller 7 using the value of the coordinates. In the present embodiment, since the data representing the coordinates is not used for a game process, the imaging information calculation section 35 can be eliminated from the controller 7.

The operation section 32 includes the respective operation keys 32a, 32b, 32c, 32d, 32e, 32f, 32g, 32h, and 32i such as the cross key 32a as described above, and outputs data representing input states of the respective operation keys 32a, 32b, 32c, 32d, 32e, 32f, 32g, 32h, and 32i (that is, data indicating whether or not any one of the operation keys 32a, 32b, 32c, 32d, 32e, 32f, 32g, 32h, and 32i has been pressed) to the micro computer 42 of the communication section 36.

The communication section 36 includes the micro computer 42, a memory 43, the wireless module 44 and the antenna 45. The micro computer 42 controls the wireless module 44 for wirelessly transmitting the data received by the micro computer 42 while using the memory 43 as a storage area during the process.

Data outputted to the micro computer 42 by the operation section 32, the imaging information calculation section 35, and the acceleration sensor 37 are temporality stored in the memory 43. The wireless transmission from the communication section 36 to the receiving unit 6 is performed at intervals of a predetermined time period. Since a game process is generally performed at a cycle of 1/60 sec. corresponding to one frame, data are preferably transmitted at a cycle of 1/60 sec. or a cycle shorter than 1/60 sec. At an appropriate time of transmission to the receiving unit 6, the micro computer 42 outputs the data stored in the memory 43 as the operation data to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the wireless module 44 modulates the operation data into the low power radio wave signal and the controller 7 outputs the low power radio wave signal. The receiving unit 6 of the game apparatus 3 receives the low power radio wave signal. The game apparatus 3 demodulates or decodes the received low power radio wave signal so as to acquire the operation data. Based on the acquired operation data and the game program, the CPU 10 of the game apparatus 3 performs a game process.

The player can perform, using the controller 7, a game operation of, for example, changing an attitude and a position of the controller 7, and rotating the controller 7, in addition to a game operation of pressing the respective operation keys, which has been conventionally performed.

Figure 9:
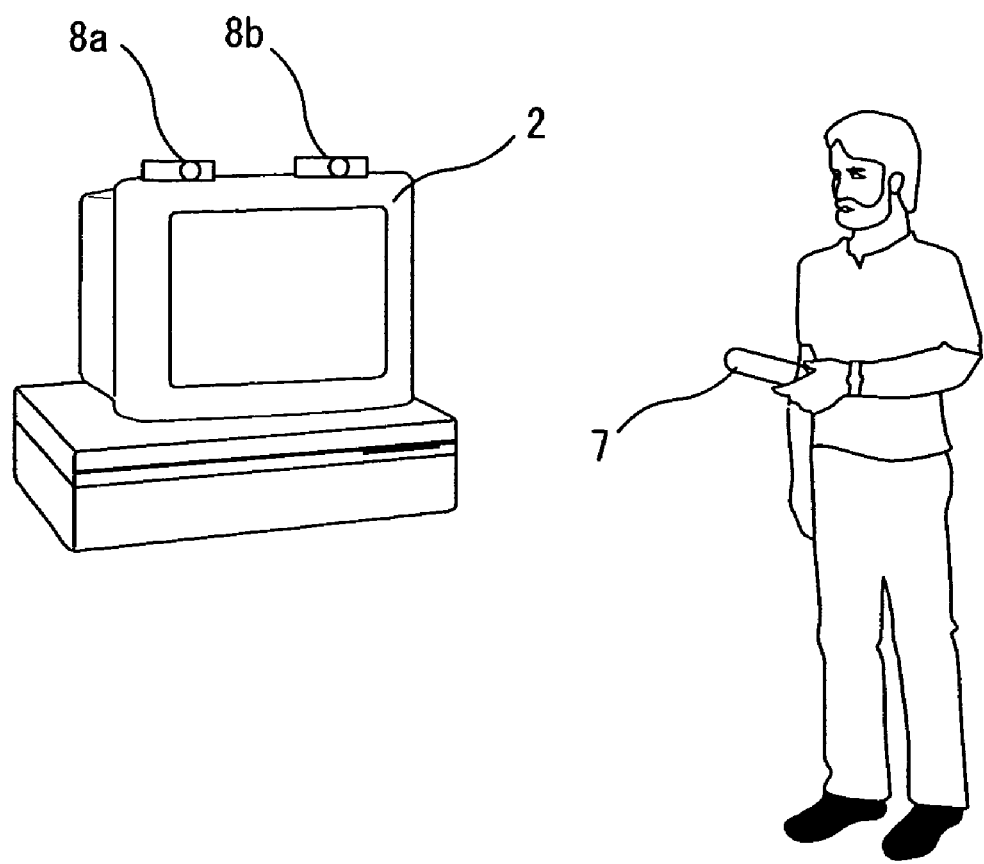
FIG. 9 is a diagram illustrating in general a state where a game is played using the controller 7.

FIG. 9 is a diagram illustrating in general a state where a game is played using the controller 7. As shown in FIG. 9, when the player uses the controller 7 to play a game with the game system 1, the player holds the controller 7 with one hand. The markers 8a and 8b are disposed, on the top of the screen, parallel to the horizontal direction of the screen of the monitor 2. In another embodiment, the positions at which the markers 8a and 8b are disposed, and the direction toward which the two markers 8a and 8b are oriented can be arbitrarily chosen. For example, the markers 8a and 8b may be disposed at the bottom of the screen, and/or the two markers 8a and 8b may be disposed along the longitudinal direction of the screen. In the present embodiment, the player holds the controller 7 so as to change a tilt of the controller 7 or move the controller 7 up and down, thereby playing the game.

Figure 10:
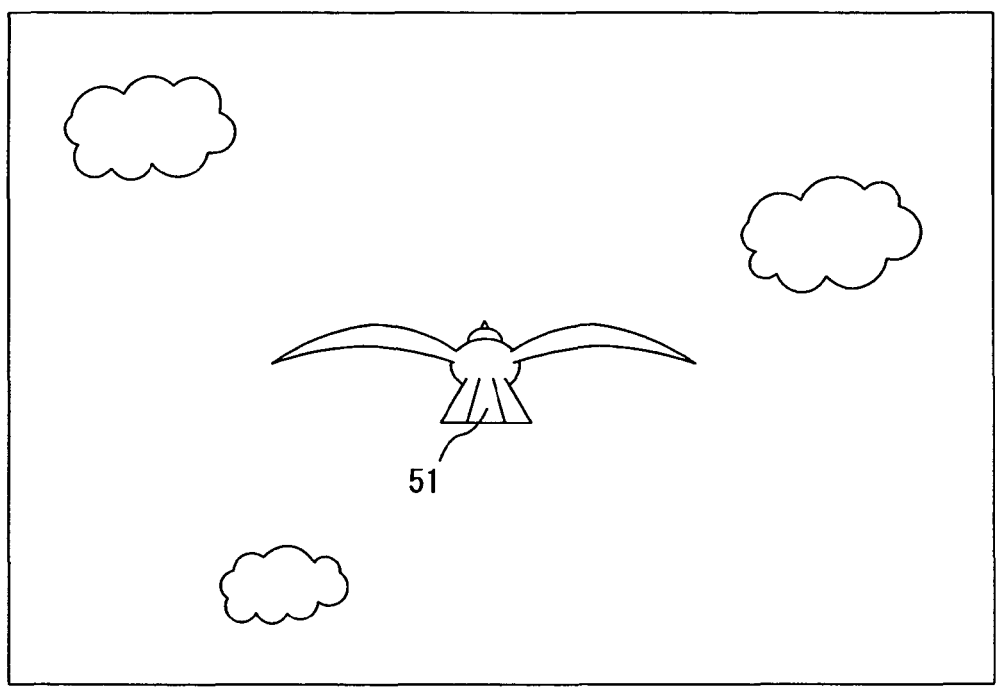
FIG. 10 is a diagram illustrating an exemplary game screen displayed on a monitor 2 according to the embodiment.
Figure 21:
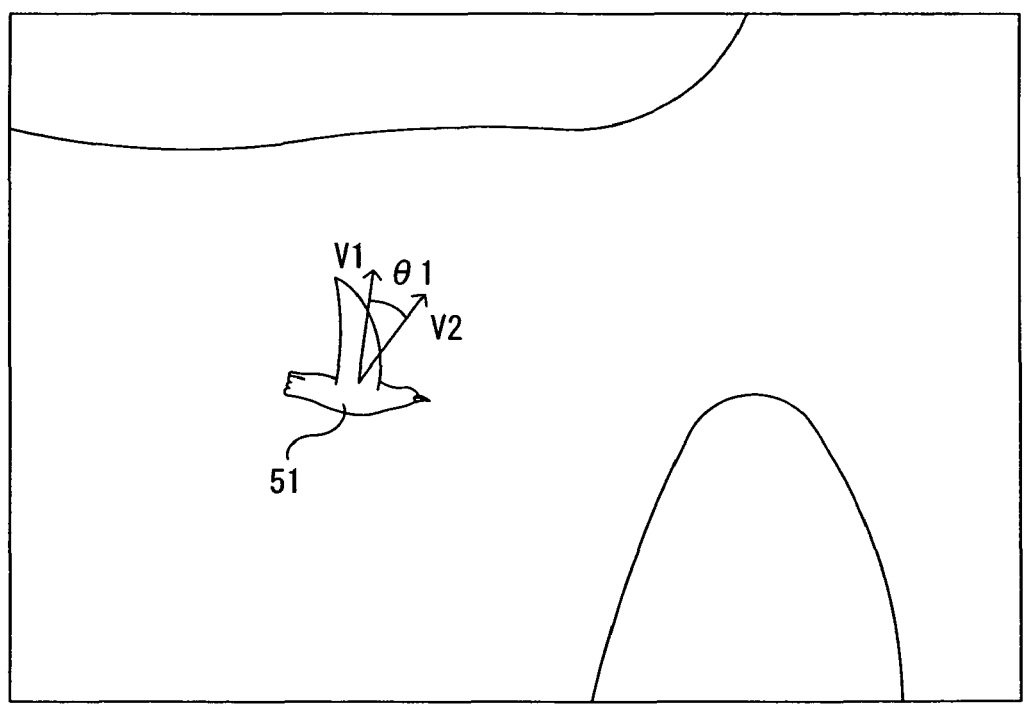
FIG. 21 is a diagram illustrating an exemplary game screen displayed on a monitor according to another embodiment.

Hereinafter, an exemplary game performed using the aforementioned game system 1 will be described. FIG. 10 is a diagram illustrating an exemplary game screen displayed on the monitor 2 according to the present embodiment. As shown in FIG. 10, an object 51 representing a bird is displayed on the monitor 2. In the present embodiment, a game image in which the object 51 appears to retreat away from the front of the screen is displayed. However, in another embodiment, a game image in which the object moves on the screen left and right or up and down, and an image of a background is scrolled left and right or up and down, may be displayed as shown in FIG. 21, which will be described below.

The player controls the object 51 so as to play the game according to the present embodiment. The game player can cause the object 51 to perform two types of actions in the game operation. The first action is an action of changing a tilt of the object 51. A second action is an action of causing the object 51 to flap its wings. The player causes the object 51 to perform the two types of actions so as to move the object 51 in the sky in a two-dimensional or three-dimensional virtual game space.

Figure 11:
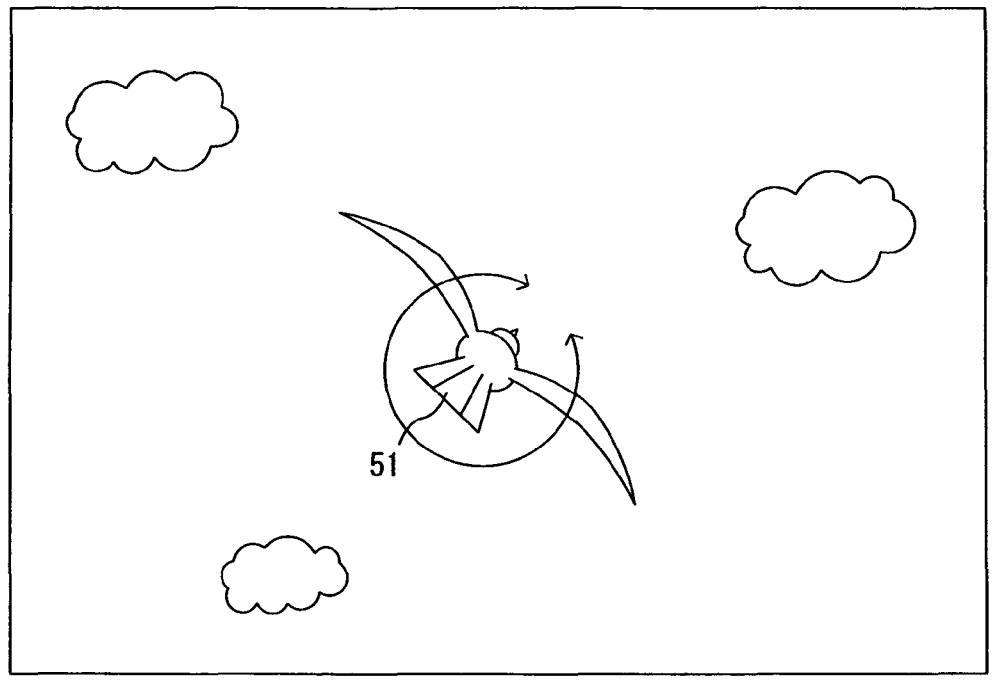
FIG. 11 is a diagram illustrating an exemplary game screen in which an object 51 is performing a first action.

FIG. 11 is a diagram illustrating an exemplary game screen in which the object 51 is performing the first action. As indicated by arrows shown in FIG. 11, the object 51 can rotate about an axis perpendicular to the screen so as to change the tilt thereof. The game apparatus 3 controls the first action of the object 51 in accordance with the tilt corresponding to the rotation of the controller 7 about the longitudinal axis thereof. For example, when the controller 7 is rotated clockwise about the z-axis by a predetermined angle as viewed from the negative to positive side in a state where the controller 7 has its top surface oriented upward as shown in FIG. 7, the attitude of the object 51 is controlled so as to be rotated clockwise by a predetermined angle as shown in FIG. 11. As shown in FIGS. 7 and 8, when the controller 7 is not moving, the tilt of the controller 7 can be calculated using the acceleration vector detected by the acceleration sensor 37. In the present embodiment, "rotation of the controller 7" refers to "rotation of the controller 7 about the longitudinal axis thereof", and "tilt of the controller 7" refers to "tilt of the controller 7 corresponding to an amount of rotation about the longitudinal axis thereof".

Figure 12:
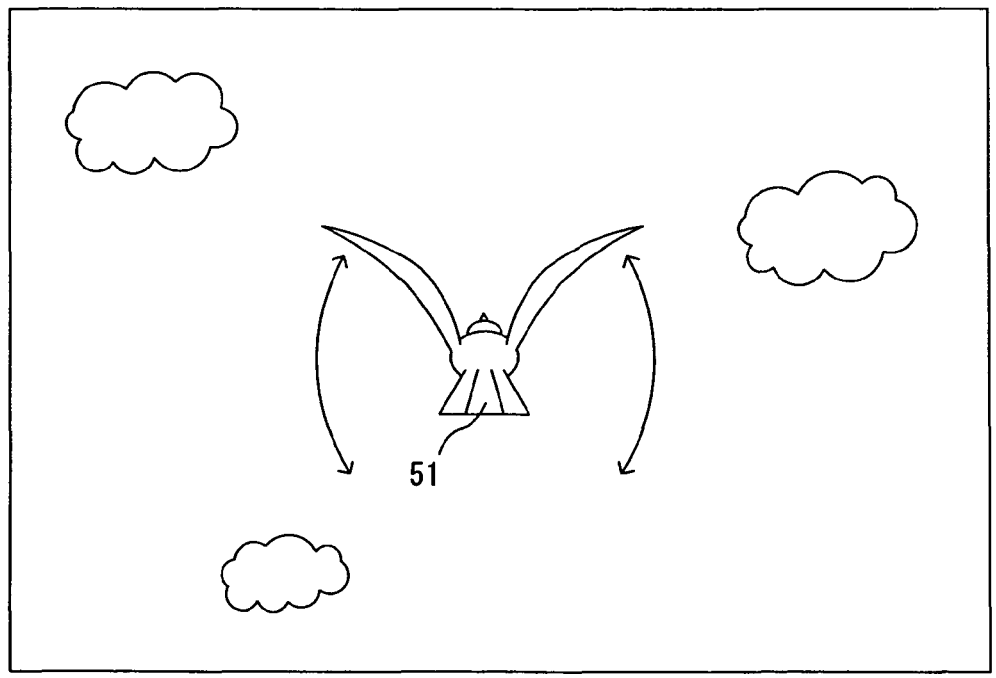
FIG. 12 is a diagram illustrating an exemplary game screen in which the object 51 is performing a second action.

FIG. 12 is a diagram illustrating an exemplary game screen in which the object 51 is performing the second action. As indicated by arrows shown in FIG. 12, the object 51 is capable of performing an action of flapping its wings upward and downward. The game apparatus 3 controls the second action performed by the object 51 in accordance with the controller 7 being moved up and down along the y-axis thereof. The up-and-down movement of the controller 7 can be calculated using the acceleration vector. Hereinafter, a method for calculating the up-and-down movement of the controller 7 using the acceleration vector will be described.

Figure 13:
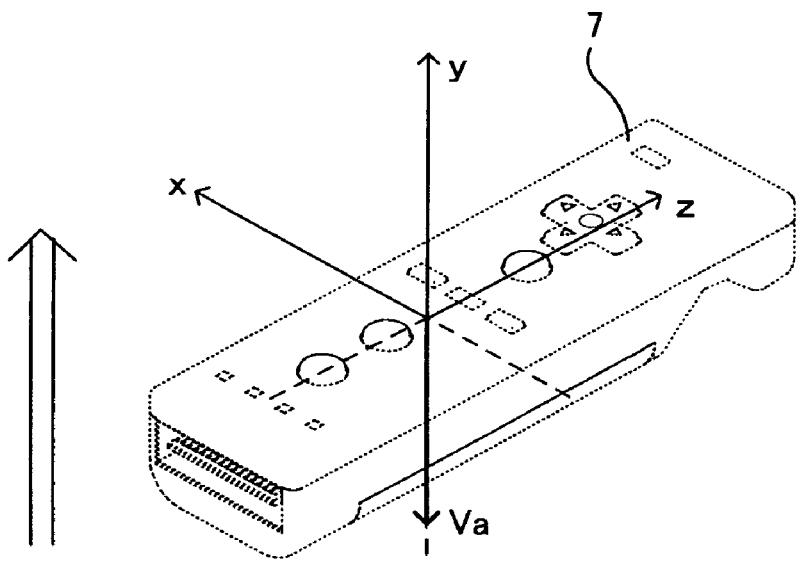
FIG. 13 is a diagram illustrating a relationship between a movement of the controller 7 and an acceleration vector.
Figure 14:
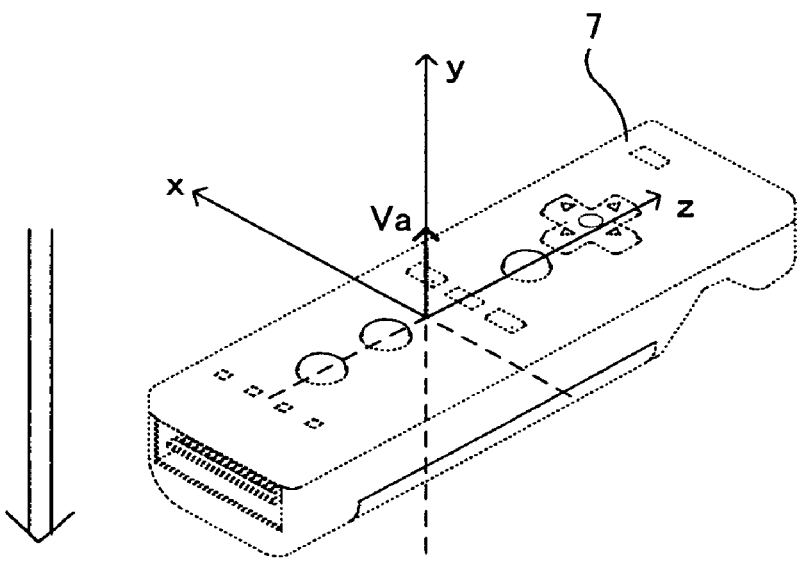
FIG. 14 is a diagram illustrating a relationship between a movement of the controller 7 and an acceleration vector.

FIGS. 13 and 14 are diagrams each illustrating a relationship between the movement of the controller 7 and the acceleration vector. In FIG. 13, the controller 7 is being moved upward at a certain acceleration. At this time, the gravitational force and the downward inertial force are applied to a detection section of the acceleration sensor 37. Therefore, the acceleration vector Va detected by the acceleration sensor 37 has a magnitude greater than an acceleration vector detected when the controller 7 is not moving. Specifically, a y-component of the acceleration vector Va detected in the state shown in FIG. 13 has a value smaller than −1.

On the other hand, in FIG. 14, the controller 7 is being moved downward at a certain acceleration. At this time, the gravitational force and the upward inertial force are applied to the detection section of the acceleration sensor 37. Therefore, the acceleration vector Va detected by the acceleration sensor 37 has a magnitude smaller than an acceleration vector detected when the controller 7 is not moving or the direction of the acceleration vector Va may be opposite to a direction of an acceleration vector detected when the controller 7 is not moving. Specifically, a y-component of the acceleration vector Va detected in the state shown in FIG. 14 has a value greater than minus one. In FIG. 14, since the upward inertial force is greater than the gravitational force, the y-component of the acceleration vector Va has a positive value.

As described above, the y-component value of the acceleration vector Va is changed in accordance with the controller 7 being moved up and down, and therefore the game apparatus 3 can calculate the up-and-down movement of the controller 7 using the acceleration vector Va. In the present embodiment, the game apparatus 3 controls the actions of the object 51 such that the object 51 flaps its wings in accordance with the controller 7 being moved up and down. Accordingly, when a player shakes the controller 7 up and down, the objects 51 moves its wings upward and downward as indicated by arrows shown in FIG. 12. When the object 51 flaps its wings, the game apparatus 3 moves the object 51 upward. When the object 51 does not flap its wings, the game apparatus 3 slowly moves the object 51 downward. Accordingly, the player needs to move the controller 7 up and down at an appropriate time so as to prevent the object 51 from falling, and thus the object 51 is caused to flap its wings.

As described above, the game apparatus 3 controls the actions of the object 51 in accordance with an operation of changing the tilt of the controller 7 and an operation of moving the controller 7 up and down. As shown in FIGS. 7 and 8, when the controller 7 is not moving, it is possible to calculate the tilt of the controller 7 using the acceleration vector. However, when the controller 7 is being moved up and down, it is impossible to accurately calculate the tilt of the controller 7 using the acceleration vector as it is. For example, in a state shown in FIG. 14, although the top surface of the controller 7 is oriented upward, the acceleration vector Va has an upward direction, that is, the acceleration vector Va has a direction opposite to the normal gravitational force. At this time, the game apparatus 3 cannot accurately calculate the tilt of the controller 7, that is, the game apparatus 3 calculates the tilt of the controller 7 in the direction opposite to an actual direction. The tilt of the controller 7 can be calculated by detecting for a direction of the gravitational acceleration applied to the controller 7. However, since the inertial force is applied to the controller 7 being moved, it is impossible to detect for only the gravitational acceleration applied to the controller 7, so that the tilt of the controller 7 cannot be accurately calculated.

In the present embodiment, the game apparatus 3 smoothes acceleration values being sequentially detected and calculates the tilt of the controller 7 using values obtained by smoothing the acceleration values. The up-and-down movement of the controller 7 is represented as components of an acceleration signal which rapidly vary. Here, the acceleration signal refers to a signal represented by chronologically plotting acceleration values being sequentially detected. That is, the number of times the controller 7 is moved up and down is almost the same as the number of times the acceleration varies. On the other hand, the tilt of the controller 7 is represented as components of the acceleration signal which slightly vary. Therefore, the components which rapidly vary are eliminated from the acceleration signal so as to extract the components representing the tilt of the controller 7. That is, the game apparatus 3 is capable of accurately calculating the tilt of the controller 7 using values obtained by smoothing the acceleration signal.

Figure 15:
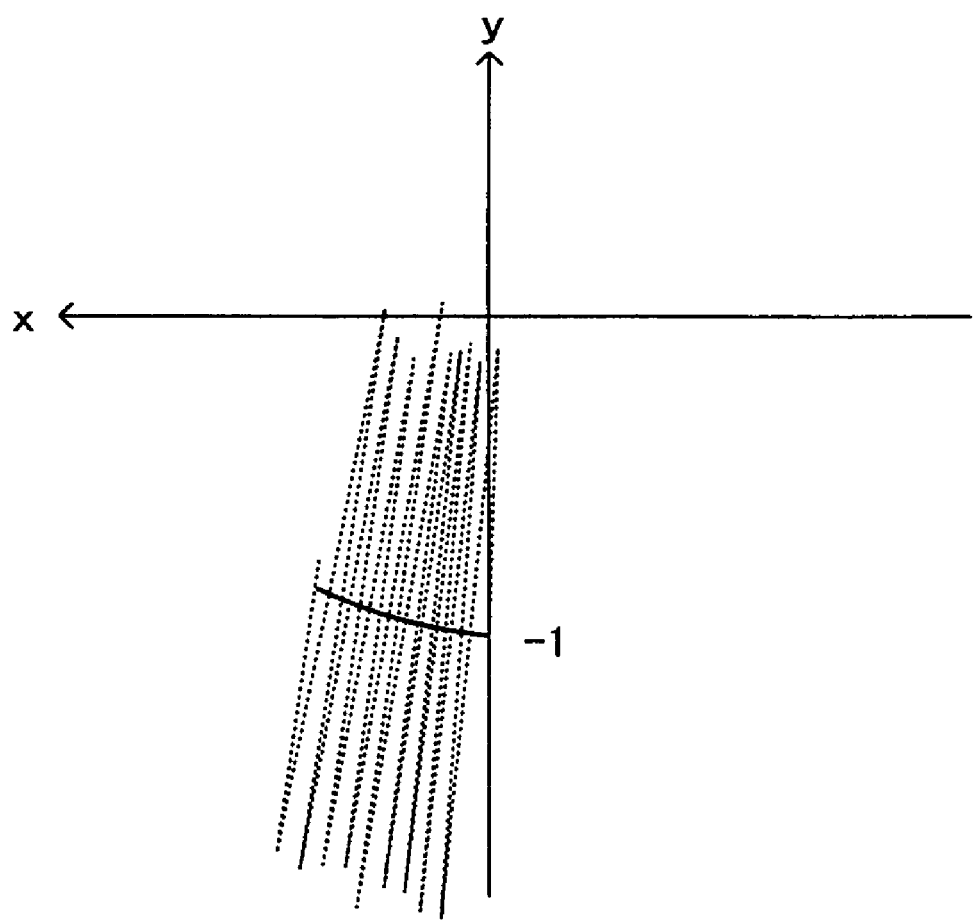
FIG. 15 is a diagram illustrating values of accelerations detected by an acceleration sensor 37 and values obtained by smoothing accelerations having been detected.

FIG. 15 is a diagram illustrating the values of the accelerations detected by the acceleration sensor 37 and values obtained by smoothing the accelerations having been detected. In the present embodiment, a value of the z-component of the acceleration vector is irrelevant to the smoothing process. Therefore, in FIG. 15, the value of the acceleration vector is represented using two-dimensional xy coordinates. Dotted lines in FIG. 15 represent the acceleration signal, that is, a variation of acceleration vectors. The acceleration signal represented by the dotted lines is detected when the controller 7, which has not been moved, is gradually rotated clockwise about the z-axis by a predetermined angle as viewed from the negative to positive side with the controller 7 having its top surface oriented upward while the controller 7 is being shaken up and down. That is, the values of the acceleration vectors vary as indicated by the dotted lines in FIG. 15. The dotted lines in FIG. 15 are obtained by plotting values of the acceleration vectors each ending at a point representing a value on the dotted lines when starting at the originating point of the xy coordinate system. A solid line shown in FIG. 15 represents a signal obtained by preferably smoothing the acceleration signal represented by the dotted lines. When the controller 7 is shaken up and down, a value of the detected acceleration signal varies such that the y-component value rapidly varies as indicated by the dotted lines in FIG. 15. On the other hand, since the controller 7 is gradually rotated about the z-axis, the rotation causes the xy-component value of the acceleration signal to vary more slightly than the shaking of the controller 7 causes the y-component of the acceleration signal to vary. Accordingly, the acceleration signal represented by the dotted lines is smoothed so as to eliminate components which rapidly vary, thereby obtaining the signal represented by the solid line. In the present embodiment, the two-dimensional acceleration vectors each having the x-component and the y-component are smoothed, thereby obtaining the result of the smoothing as a two-dimensional vector. Hereinafter, the vector obtained through the smoothing is referred to as a smoothed vector. The smoothed vectors vary as a signal represented by the solid line in FIG. 15. The solid line in FIG. 15 is obtained by plotting values of the smoothed vectors each ending at a point representing a value on the solid line when starting at the originating point of the xy coordinate system. That is, the solid line represents a variation in tilt of the controller 7. Thus, the acceleration signal detected by the acceleration sensor 37 is smoothed so as to obtain a signal representing the variation in tilt of the controller 7.

As described above, according to the present embodiment, the game apparatus 3 calculates the movement of the controller 7 using the values of the accelerations detected by the acceleration sensor 37 as they are, and calculates the tilt of the controller 7 using values obtained by smoothing the values of the accelerations having been detected. Thus, the game apparatus 3 is capable of simultaneously calculating the movement and the tilt of the controller 7 using the acceleration vector detected by the acceleration sensor 37. Accordingly, the game apparatus 3 is capable of simultaneously controlling two states, i.e., the movement and the tilt of the controller 7, using one sensor.

Figure 16:
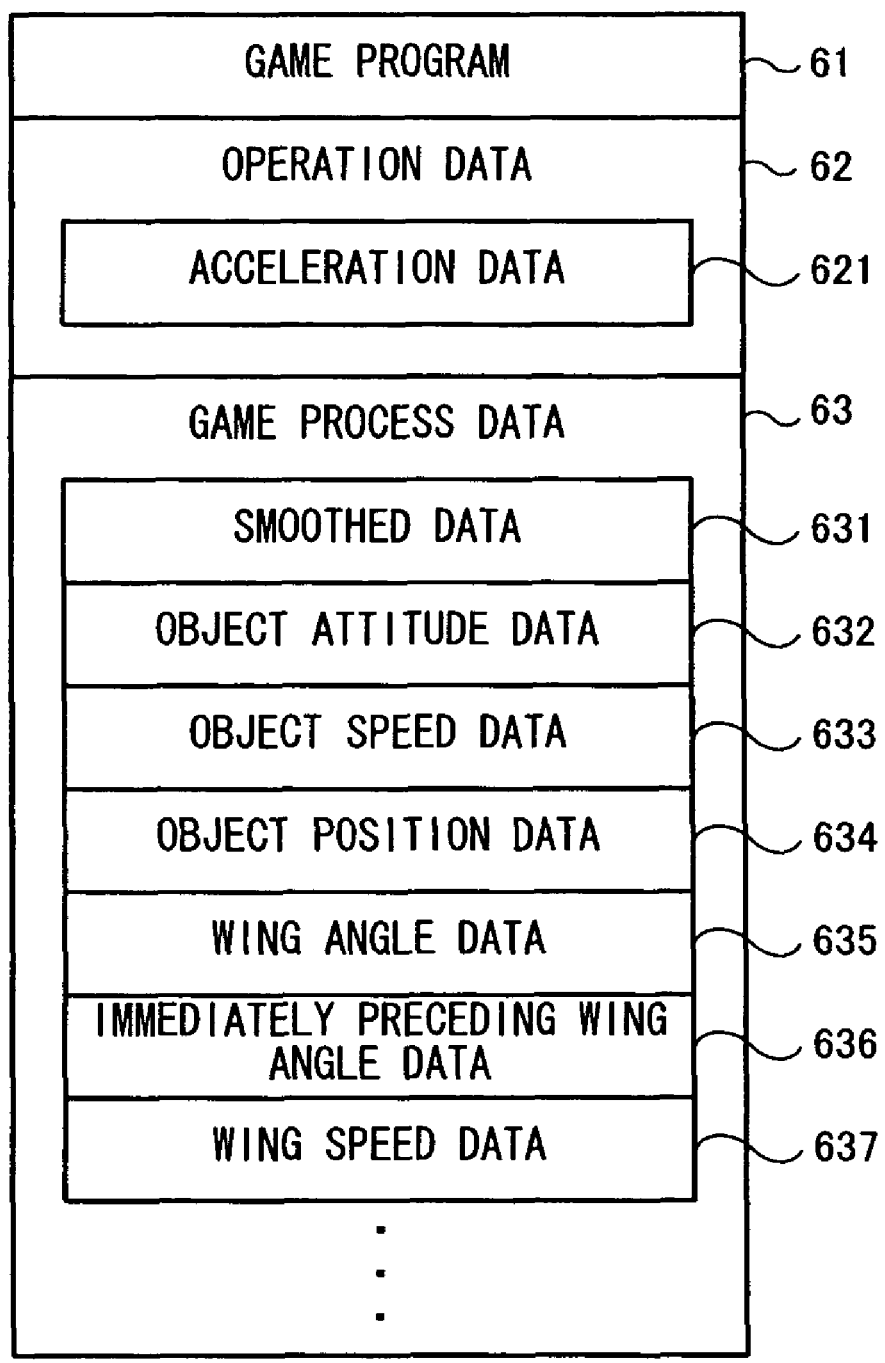
FIG. 16 is a diagram illustrating main data to be stored in a main memory 13 of the game apparatus 3.

Next, a program process executed by the game apparatus 3 according to the present embodiment will be described. With reference to FIG. 16, main data to be used for the game process will be described. FIG. 16 is a diagram illustrating main data to be stored in the main memory 13 of the game apparatus 3. As shown in FIG. 16, the main memory 13 stores a game program 61, operation data 62, game process data 63, and the like. The main memory 13 stores data necessary for the game process, such as image data of objects appearing in a game, in addition to the data shown in FIG. 16.

A portion of or all of the game program 61 are loaded from the optical disc 4 to the main memory 13 at an appropriate time after the game apparatus 3 is powered on, and are stored in the main memory 13. The game program 61 contains a program required for executing the game process described below.

The operation data 62 is transmitted from the controller 7 to the game apparatus 3 and stored in the main memory 13. The operation data 62 contains the acceleration data 621. The acceleration data 621 represents an acceleration vector Va detected by the acceleration sensor 37. The operation data 62 may contain data representing positions of the imaging subjects (markers 8a and 8b) in the taken image and data representing an operation performed on the respective buttons of the operation section 32, in addition to the acceleration data 621.

The game process data 63 is used for the game process described below. The game process data 63 contains smoothed data 631, object attitude data 632, object speed data 633, object position data 634, wing angle data 635, immediately preceding wing angle data 636, and wing speed data 637.

The smoothed data 631 represents a value obtained by smoothing the acceleration signal of the acceleration vectors which are sequentially detected. The smoothed data 631 is represented as a two-dimensional vector (smoothed vector) obtained by smoothing the x-component and the y-component of the acceleration vector. Each time the acceleration data is acquired, the smoothed data 631 is calculated using the acceleration data which has been acquired and the smoothed data which has been most recently calculated.

Figure 17:
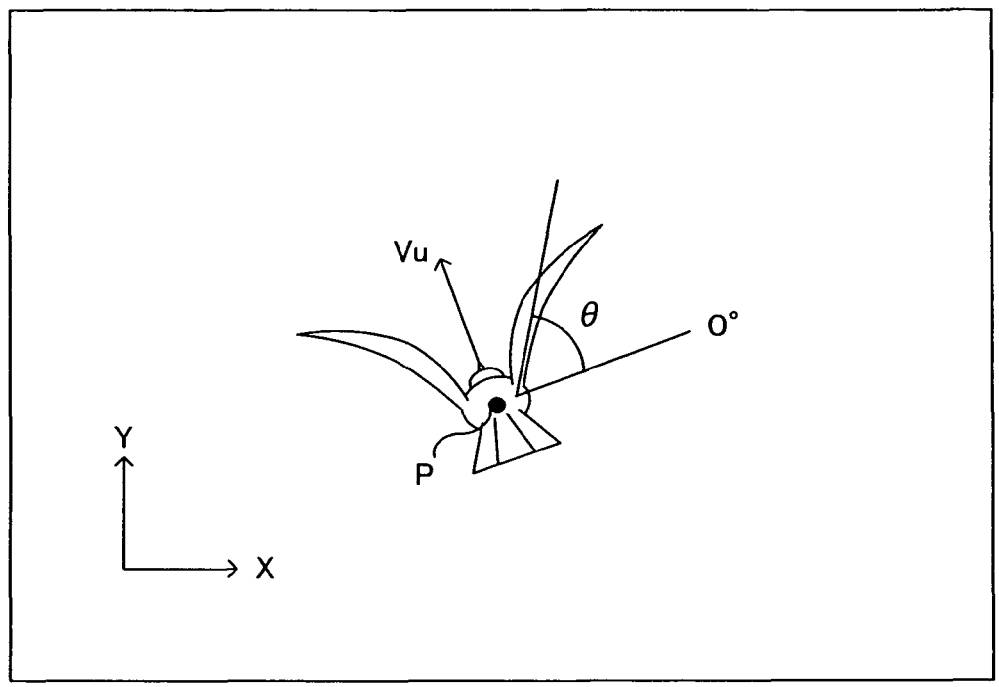
FIG. 17 is a diagram illustrating parameters relating to the object 51.

The data 632 to 637 each represents a parameter relating to the object 51. FIG. 17 is a diagram illustrating the respective parameters of the object 51. The object attitude data 632 represents an attitude of the object 51. The attitude of the object 51 is represented as a vector Vu having a direction toward which the head of the object 51 is oriented as shown in FIG. 17. The vector Vu indicates a position on the screen in the XY coordinate system. In the present embodiment, in the XY coordinate system, the rightward direction of the screen represents the X-axis positive direction, and the upward direction of the screen represents the Y-axis positive direction (see FIG. 17).

The object speed data 633 represents a speed of the object 51. That is, the object speed data 633 represents a vector indicating a movement distance over and a moving direction toward which the object 51 moves on the screen for each unit time corresponding to one frame. Specifically, the object speed data 633 is represented as a two-dimensional vector in the XY coordinate system. The object position data 634 represents a position P of the object 51 on the screen as shown in FIG. 17. Specifically, the object position data 634 represents a coordinate value in the XY coordinate system. The object position data 634 is calculated using the object speed data 633.

The wing angle data 635 represents an angle θ of the wing of the object 51. As shown in FIG. 17, the angle θ of the wing of the object 51 is set to zero degree when the wings are horizontally aligned with the position P of the object 51 so as to form a straight line, the angle θ of the wing of the object 51 has a positive value when the wings are moved upward from the position P of the object 51, and the angle θ of the wing of the object 51 has a negative value when the wings are moved downward from the position P of the object 51. Further, the angle θ of the wing is set so as to satisfy −90 degrees≦θ≦90 degrees. The immediately preceding wing angle data 636 represents the wing angle data 635 which has been calculated at the immediately preceding time.

The wing speed data 637 represents an amount of change of the angle of the wing of the object 51 for each unit time corresponding to one frame. Specifically, the wing speed data 637 represents a difference Δθ between the angle of the wing having been most recently calculated and the angle of the wing immediately preceding the angle of the wing having been most recently calculated.

Figure 18:
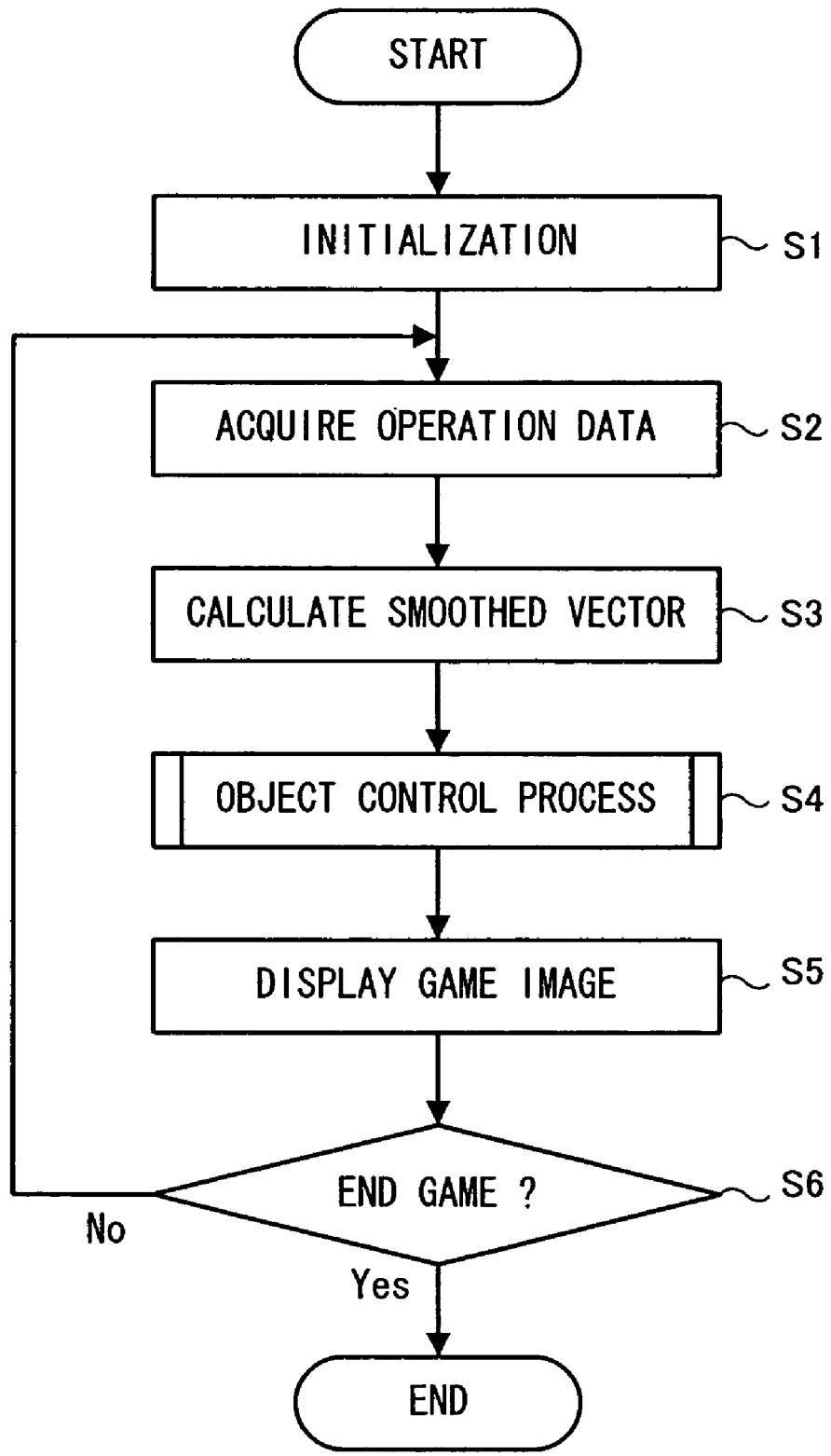
FIG. 18 is a main flow chart illustrating a flow of a process performed by the game apparatus 3.

Next, with reference to FIGS. 18 to 20, a process performed by the game apparatus 3 will be described in detail. FIG. 18 is a main flow chart illustrating a flow of the process performed by the game apparatus 3. When the game apparatus 3 is powered on, the CPU 10 of the game apparatus 3 executes a boot program stored in a boot ROM (not shown) so as to initialize units such as, for example, the main memory 13. The game program stored in the optical disc 4 is loaded into the main memory 13, and the CPU 10 starts the execution of the game program. The flow chart shown in FIG. 18 illustrates a process performed after the aforementioned process is completed.

In step S1, data used for the following process steps are initialized. That is, the CPU 10 initializes the smoothed data 631, the object speed data 633, the object position data 634, and the immediately preceding wing angle data 636 as follows. The smoothed data 631 is set as a two-dimensional vector representing (0, −1) in the xy coordinate system. The object speed data 633 is set as a two-dimensional vector representing (0, 0) in the XY coordinate system. The object position data 634 is set to a coordinate value representing an initial position which is preset in the XY coordinate system. The immediately preceding wing angle data 636 is set so as to represent zero degree. The aforementioned initialized data are stored in the main memory 13. Following step S1, a process loop of steps S2 to S6 corresponding to one frame is repeated, thereby playing the game.

In step S2, the CPU 10 acquires operation data from the controller 7. That is, the controller 7 transmits the operation data to the game apparatus 3 at intervals of a predetermined time period (for example, at intervals of a time period corresponding to one frame or a time period shorter than one frame), and the CPU 10 stores, in the main memory 13, the operation data having been transmitted. The operation data contains at least the acceleration data. The CPU 10 stores the acceleration data in the main memory 13. In the present embodiment, the process of step S2 is performed for each frame, so that the game apparatus 3 can sequentially acquire the acceleration data.

In step S3, the smoothed vector is calculated using the acceleration data having been acquired in step S2. In the present embodiment, the CPU 10 calculates the smoothed vector using the acceleration vector represented by the acceleration data 621 having been acquired in step S2 and the smoothed vector having been most recently calculated. The smoothed vector having been most recently calculated is represented by the smoothed data 631 which has been stored in the main memory 13 immediately before step S3 is performed. Specifically, the smoothed vector (bx, by) is calculated using equation 1 as follows.

$$bx = bx' + (ax - bx') \times k1$$

$$by = by' + (ay - by') \times k1 \qquad \text{equation 1}$$

where a variable ax represents an x-component value of the acceleration vector, a variable ay represents a y-component value of the acceleration vector, a variable bx' represents an x-component value of the smoothed vector having been most recently calculated, a variable by' represents a y-component value of the smoothed vector having been most recently calculated, and a constant k1 is a preset value. The constant k1 is set to, for example, 0.03 so as to eliminate the component of the acceleration vector varying in accordance with the controller 7 being moved up and down. Data representing the smoothed vector (bx, by) calculated in step S3 is stored in the main memory 13 as the smoothed data.

Figure 19:
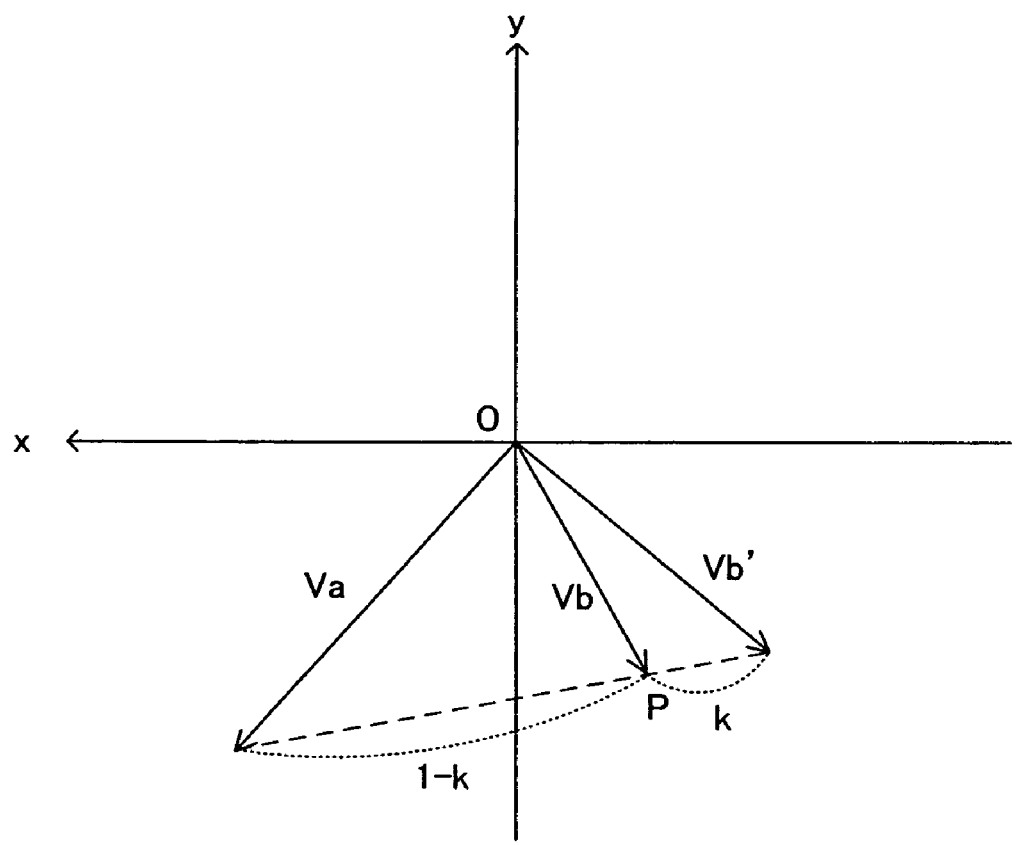
FIG. 19 is a diagram illustrating a method for calculating a smoothed vector.

FIG. 19 is a diagram illustrating a method for calculating the smoothed vector. In FIG. 19, the vector Va represents the acceleration vector of only the x-component and the y-component, and the vector Vb' represents the smoothed vector having been most recently calculated. At this time, the vector Vb is calculated as the smoothed vector using equation 1. As shown in FIG. 19, the smoothed vector Vb is obtained by moving the smoothed vector Vb' having been most recently calculated toward the acceleration vector Va at a predetermined rate (k). Specifically, the smoothed vector Vb represents a vector, starting at the originating point and ending at a point P which is obtained by internally dividing, at a ratio of k to (1−k), a line segment connecting between an end point of the acceleration vector Va and an end point of the smoothed vector Vb' having been most recently calculated. As shown in FIG. 19, according to the present embodiment, the smoothed vector is calculated so as to vary in accordance with the acceleration vector, thereby smoothing the acceleration detected by the acceleration sensor 37.

Returning to FIG. 18, following step S3, in step S4, an object control process is performed. The object control process refers to a game process in which the action of the object 51 is controlled using the acceleration data and the smoothed data having been obtained in steps S2 and S3. Hereinafter, with reference to FIG. 20, the object control process will be described in detail.

Figure 20:
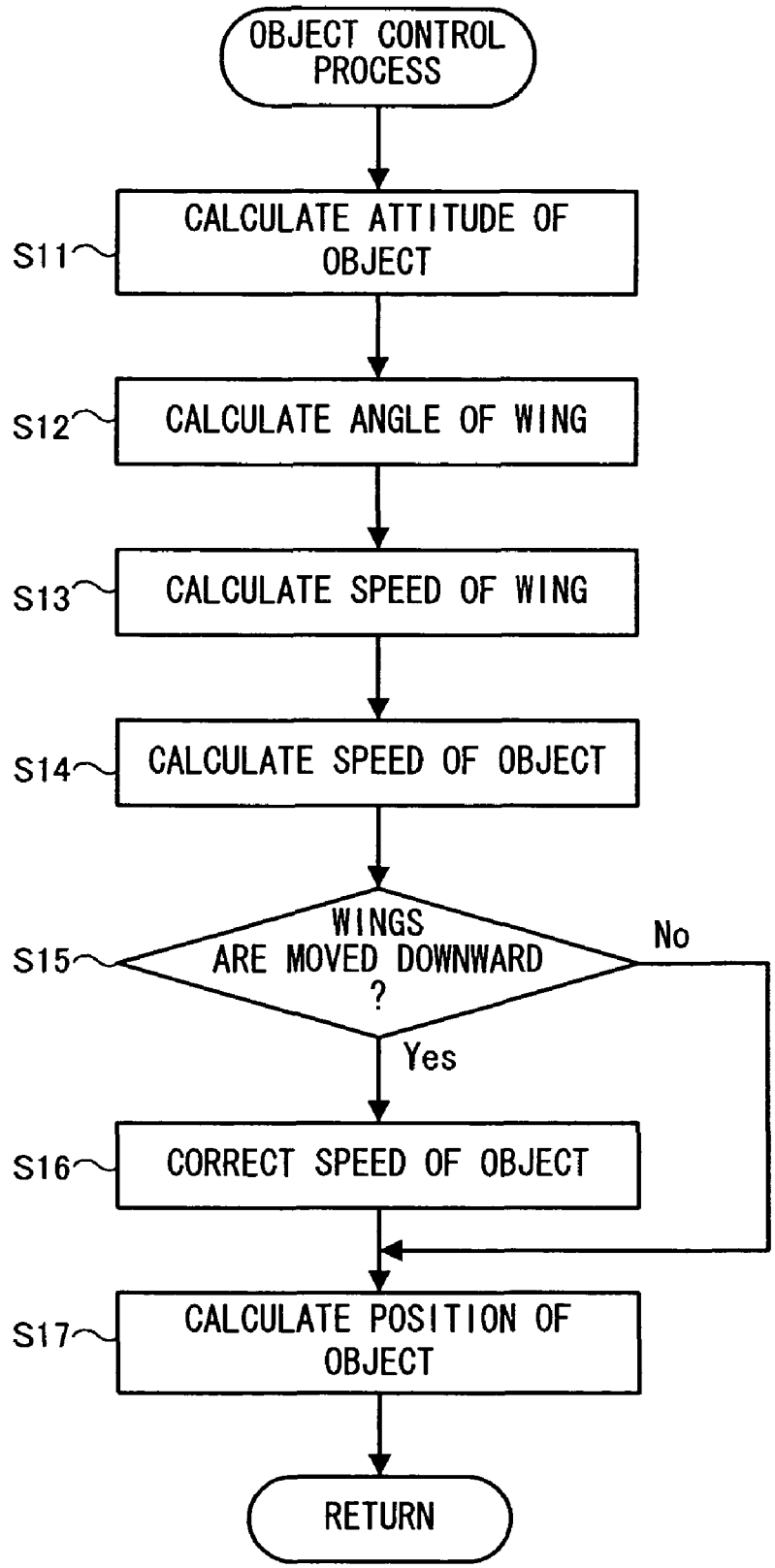
FIG. 20 is a flow chart illustrating in detail an object control process (step S4) shown in FIG. 18.

FIG. 20 is a flow chart illustrating in detail the object control process (step S4) shown in FIG. 18. In the object control process, the CPU 10 calculates an attitude of the object 51 in step S11. The attitude of the object 51 is calculated based on the attitude of the controller 7, that is, based on the smoothed data 631. Specifically, the CPU 10 calculates a vector Vu=(UX, UY) representing the attitude of the object 51 using equation 2 as follows:

$$UX = bx$$

$$UY = -by \qquad \text{equation 2}$$

where a variable bx represents an x-component value of the smoothed vector represented by the smoothed data 631, and a variable by represents a y-component value of the smoothed vector represented by the smoothed data 631. Using equation 2, the smoothed vector having a direction in the xy coordinate system is transformed into the vector Vu having a direction in the XY coordinate system. Data representing the vector Vu having been calculated in step S11 is stored in the main memory 13 as the object attitude data 632.

In step S12, the CPU 10 calculates an angle of the wing of the object 51. The angle θ of the wing is calculated based on the up-and-down movement of the controller 7, that is, based on the acceleration data 621. Specifically, the CPU 10 calculates the angle θ of the wing using equation 3.

$$θ=(ay-by)×k2 \quad\quad \text{equation 3}$$

where a variable ay represents a y-component value of the acceleration vector represented by the acceleration data 621, a variable by represents a y-component value of the smoothed vector represented by the smoothed data 631, and a constant k2 is a preset value. The value of the constant k2 is determined, in consideration of a range (corresponding to a range of values detectable by the acceleration sensor 37) within which the variable ay varies, such that the angle θ of the wing satisfies $-90$ degrees $\leq θ \leq 90$ degrees.

The y-component (variable ay) of the acceleration vector contains a component representing the shaking of the controller 7 and a component (variable by) representing the rotation of the controller 7. Using equation 3, a difference between the y-component ay of the acceleration vector and the y-component by of the smoothed vector is calculated so as to extract the component representing the shaking of the controller 7 from the y-components of the acceleration vector. Thus, only the component representing the shaking of the controller 7 can be extracted, thereby ensuring that the movement (shaking) of the controller 7 can be calculated with enhanced accuracy. The angle θ of the wing is calculated using the difference between the y-component ay of the acceleration vector and the y-component by of the smoothed vector, so that θ=0 is satisfied when the controller 7 stops (that is, when ay=by is satisfied). Thus, the wings of the object 51 are horizontally aligned with the position of the object 51 when the controller 7 is not moving, thereby naturally representing the action of the object 51. In another embodiment, the acceleration vector (variable ay) may be used for equation 3 as it is, instead of the difference (ay−by). In other words, the angle θ of the wing of the object, and even a speed or a position of the object, which are determined based on the angle θ, may be calculated using only the acceleration vector.

Data representing the angle θ of the wing calculated in step S12 is stored in the main memory 13 as the wing angle data 635. At this time, the wing angle data 635 having been calculated immediately before step S12 is performed is stored in the main memory 13 as the immediately preceding wing angle data 636, which is used to calculate a wing speed in step S13.

In step S13, the CPU 10 calculates a speed of the wing of the object 51. The speed Δθ of the wing is calculated using the angle θ of the wing represented by the wing angle data 635 and the angle θ' of the wing represented by the immediately preceding wing angle data 636. The CPU 10 calculates the speed Δθ of the wing using equation 4 as follows.

$$Δθ=θ-θ' \quad\quad \text{equation 4}$$

Data representing the speed Δθ of the wing calculated in step S13 is stored in the main memory 13 as the wing speed data 637.

Following step S13, a speed of the object 51 is determined in steps S14 to S16. In step S14, the CPU 10 initially calculates the speed of the object 51. The speed calculated in step S14 is a temporary speed. The speed calculated in step S14 may be corrected as necessary in step S16 as described below. In step S14, the speed of the object 51 is calculated using the speed of the object having been most recently calculated. The speed of the object having been most recently calculated is represented by the object speed data 633 which has been stored in the main memory 13 immediately before step S14 is performed. The CPU 10 calculates the temporary speed V'''=(VX'', VY'') of the object 51 using equation 5 as follows:

$$VX''=VX'×k3$$

$$VY''=VY'×k3+g \quad\quad \text{equation 5}$$

where a variable VX' represents an X-component value of a vector representing the speed of the object having been most recently calculated, a variable VY' represents a Y-component value of a vector representing the speed of the object having been most recently calculated, and a constant k3 and a constant g are preset values. The constant k3 is determined so as to satisfy 0<k3<1 such that the speed having been most recently calculated is reduced. The constant g is determined so as to satisfy g<0 such that a virtual gravitational force is applied to the object 51 and the object 51 is thus caused to move downward on the screen. Data representing the speed V of the object 51 calculated in step S14 is stored in the main memory 13 as the object speed data 633.

In step S15, the CPU 10 determines whether or not the wings of the object 51 are moving downward. The determination in step S15 is performed based on the speed Δθ of the wing represented by the wing speed data 637. That is, when the speed 40 of the wing has a negative value, the wings of the object 51 are determined as moving downward. When the speed Δθ of the wing has a value greater than or equal to zero, the wings of the object 51 are determined as not moving downward. When the wings of the object 51 are determined in step S15 to be moving downward, the process advances to step S16. In step S16, the temporary speed calculated in step S14 is corrected, and the corrected speed is determined as the speed of the object 51. On the other hand, when the wings of the object 51 are determined as not moving downward, step S16 is skipped and the process advances to step S17. When step S16 is skipped, the temporary speed calculated in step S14 is determined as the speed of the object 51 as it is.

In step S16, the temporary speed of the object 51 calculated in step S14 is corrected. The temporary speed is corrected in accordance with the up-and-down movement of the controller 7, that is, in accordance with the speed Δθ of the wing represented by the wing speed data 637. Specifically, the CPU 10 calculates the corrected speed V=(VX, VY) using equation 6 as follows.

$$VX=VX''+UX×Δθ$$

$$VY=VY''+UY×Δθ \quad\quad \text{equation 6}$$

where a variable VX'' represents an X-component of a vector representing the temporary speed calculated in step S14, a variable VY'' represents a Y-component of a vector representing the temporary speed calculated in step S14, a variable UX represents an x-component value of the vector representing the attitude of the object 51, a variable UY represents a Y-component value of the vector representing the attitude of the object 51. The vector representing the attitude of the object 51 is represented by the object attitude data 632.

As can be seen from equation 6, the speed of the object 51 is calculated by adding, to the temporary speed V'', a speed at which the object 51 is to be moved upward (a direction of the vector representing the attitude of the object 51). Accordingly, in the present embodiment, when the wings move downward in accordance with the controller 7 being moved up and down, the speed at which the object 51 is to be moved upward is applied to the object 51, thereby moving the object 51 upward. That is, the direction (that is, the speed) toward which the position of the object 51 is moved is determined based on the attitude of the object 51 which is determined using the smoothed vector. Thus, both the variable (the speed of the wing in the present embodiment) determined using the acceleration vector and the variable (the attitude of the object in the present embodiment) determined using the smoothed vector are used to determine the action (the speed of the object in the present embodiment) of the object 51, thereby enabling increasingly elaborated object control.

According to equation 6, when the wings move downward in accordance with the controller 7 being moved up and down, the speed at which the object 51 is to be moved upward is applied to the object 51. In another embodiment, the direction toward which the controller 7 is moved may not be necessary the same as the direction toward which the speed is applied to the object 51. For example, in another embodiment, as shown in FIG. 21, a game image may be displayed in which the object 51 representing a bird is seen from the side thereof such that the object 51 is moved rightward and leftward. In this case, a speed may be applied to the object 51 such that the vector V1 representing the attitude of the object 51 is moved forward from the position of the object 51 by a predetermined angle θ1. In FIG. 21, a vector V2 represents the speed of the object 51.

As can be seen from equation 6, the speed to be added in the correction process of step S16 is changed in accordance with the speed $\Delta\theta$ of the wing. The greater value the speed $\Delta\theta$ of the wing has, the grater value the speed to be added has. Accordingly, in the present embodiment, the faster the controller 7 is moved up and down, the faster the object 51 moves. Data representing the speed V of the object 51 obtained through the correction of step S16 is stored in the main memory 13 as the object speed data 633.

In step S17, the CPU 10 calculates a position of the object 51. The position of the object 51 is calculated using the speed of the object 51 calculated in steps S14 to S16, that is, using the vector (VX, VY) represented by the object speed data 633. Specifically, the CPU 10 calculates coordinates (PX, PY) representing the position of the object 51 using equation 7 as follows.

$$PX=PX'+VX$$

$$PY=PY'+VY \qquad \text{equation 7}$$

where a variable PX' represents an X-coordinate value representing a position of the object 51 having been most recently calculated, a variable PY' represents a Y-coordinate value representing a position of the object 51 having been most recently calculated. The coordinates (PX', PY') representing the position of the object 51 having been most recently calculated are represented by the object position data 634 which has been stored in the main memory 13 immediately before step S17 is performed. Data which is calculated in step S17 and represents the position of the object 51 is stored in the main memory 13 as the object position data 634. When the process of step S17 is completed, the CPU 10 ends the object control process.

Returning to FIG. 18, following step S4, in step S5, a game image is generated in accordance with the game process having been performed in step S4, thereby displaying the game image on the monitor 2. At this time, the object 51 with the attitude represented by the object attitude data 632 is displayed at a position represented by the object position data 634. Further, the game image is displayed such that the wings of the object 51 each has an angle corresponding to the angle θ represented by the wing angle data 635.

In step S6, the CPU 10 determines whether or not the game is to be ended. The determination of step S6 is performed based on, for example, whether or not a player has cleared the game or whether or not, if time limit is set for the game, the time limit has been exceeded. When the CPU 10 determines in step S6 that the game is not to be ended, the process is returned to step S2, and the process loop of steps S2 to S6 is repeated until the CPU 10 determines that the game is to be ended. On the other hand, when the CPU 10 determines in step S6 that the game is to be ended, the CPU 10 ends the process shown in FIG. 18. This is the end of the process to be performed by the game apparatus 3.

As described above, in the present embodiment, the game apparatus 3 calculates, in step S12, the angle of the wing of the object 51 using the acceleration vector detected by the acceleration sensor 37. The position of the object 51 is determined using the angle of the wing in steps S13 to S17. Further, the game apparatus 3 calculates, in step S11, the attitude of the object 51 using the smoothed vector obtained by smoothing the acceleration vector. Thus, the game apparatus 3 can control the angle (the position of the object 51) of the wing of the object 51 in accordance with the controller 7 being moved up and down while controlling the attitude of the object 51 in accordance with the tilt of the controller 7.

In the present embodiment, a method for calculating the smoothed vector using the acceleration vector having been most recently acquired and the smoothed vector having been most recently calculated is used as the method for smoothing the accelerations. However, the method for smoothing the accelerations is not restricted thereto. Any method for extracting a component which (relatively) slightly varies by eliminating a component of the acceleration which (relatively) rapidly varies can be used. For example, in another embodiment, a low pass filter can be used to extract low frequency components from the acceleration signal of a plurality of acceleration vectors which are sequentially detected in a predetermined time period. Components representing the rotation of the controller 7 can be extracted from the components of the acceleration signal when the low frequency components are extracted from the acceleration signal. Further, in step S12, when a high pass filter is used to extract high frequency components of the acceleration signal, components representing the up-and-down movement of the controller 7 can be extracted from the components of the acceleration signal without calculating the aforementioned difference between the y-component value of the acceleration vector and the y-component value of the smoothed vector. Further, the game apparatus 3 may calculate the smoothed vector in a certain frame in the manner described below. That is, the game apparatus can calculate the smoothed vector in a certain frame using three acceleration vectors, i.e., the acceleration vector having been acquired in a frame immediately preceding the certain frame, the acceleration vector acquired in the certain frame, and the acceleration vector to be acquired in a frame immediately following the certain frame. More specifically, an average value of the three acceleration vectors can be used as the smoothed vector. In the smoothing method according to the present embodiment, data acquired in a current frame and data having been acquired in a frame immediately preceding the current frame are used to calculate the smoothed vector, thereby enabling the real time calculation of the smoothed vector. Therefore, since a rapid response operation can be realized, the smoothing method according to the present embodiment is greatly useful for a game requiring the rapid-response operation.

In the present embodiment, since the game apparatus 3 applies the tilt of the controller 7 in the x-axis direction and the y-axis direction to the game operation, the game apparatus 3 smoothes the two-dimensional acceleration vector of the x-component and the y-component, resulting in the two-dimensional smoothed vector being calculated. In another embodiment, the game apparatus 3 may smooth a three-dimensional acceleration vector of the x-axis component, the y-axis component and the z-axis component so as to calculate a three-dimensional smoothed vector. Thus, the game apparatus 3 can calculate the tilt of the controller 7 in each of the three-dimensional directions. In still another embodiment, the game apparatus 3 may smooth one of the acceleration in the x-axis direction, the acceleration in the y-axis direction, and the acceleration in the z-axis direction, and use the smoothed value (scalar value) to perform the game process. For example, it is possible to infer the tilt of the controller 7 in the x-axis direction and the y-axis direction by using only a magnitude of the acceleration in the y-axis direction. In this case, the structure of the controller 7 and the game process can be simplified.

Moreover, in the present embodiment, the game apparatus 3 calculates the up-and-down (that is, the y-axis direction) movement of the controller 7, so that the game process is performed based on only the y-component of the acceleration vector using equation 3. In another embodiment, the game apparatus 3 may calculate the movement of the controller 7 using two or three components among the x-component, the y-component, and the z-component of the acceleration vector. For example, the x-component and the y-component of the acceleration vector may be used to perform the game process. In this case, the up-and-down movement and the leftward and rightward movement of the controller 7 can be used to perform the game process.

Furthermore, in the present embodiment, in an exemplary game process performed using the acceleration data and the smoothed data, the position of the object is calculated using the acceleration data, and the attitude of the object is calculated using the smoothed data. Certain example embodiments may also apply to a game apparatus and a game program for allowing other various game processes to be executed using the acceleration data and the smoothed data.

For example, an embodiment is applicable to a horse racing game. In the horse racing game, a player controls an object representing a jockey on a horse using the controller 7. For example, the game apparatus 3 determines a speed of the horse using the acceleration data, and determines a direction toward which the horse gallops using the smoothed data. Specifically, the game apparatus 3 calculates, using the smoothed data, the tilt corresponding to the rotation of the controller 7 about the z-axis. The direction toward which the horse gallops is determined depending on the tilt of the controller 7. On the other hand, the game apparatus 3 calculates the up-and-down movement of the controller 7 using the detected acceleration data so as to determine whether or not the controller 7 is moving downward. Thus, the speed of the object may be calculated. Specifically, when the game apparatus 3 determines that the controller 7 is moved downward, the game apparatus 3 causes the jockey to whip the horse. Further, the speed of the horse is calculated based on the number of times the jockey whips the horse for each predetermined unit time. Thus, the player can control the direction toward which the horse gallops by tilting the controller 7, and the player can control the speed of the horse by using the controller 7 as if the controller 7 is a riding whip, thereby playing a novel game which cannot be realized by a conventional art.

The game apparatus 3 can determine whether or not the controller 7 is moved downward depending on, for example, whether or not the acceleration vector maintains a y-component value greater than a predetermined value for a predetermined time period. More specifically, when the acceleration vector maintains a positive y-component value for a time period corresponding to a predetermined number of frames, the game apparatus 3 determines that the controller 7 is moved downward. When the game apparatus 3 determines that the controller 7 is moved downward, the game apparatus 3 increases the speed of the object.

Further, an embodiment is applicable to a game for allowing a player to control an object riding a unicycle. In this game, for example, the game apparatus 3 causes the object to jump using the acceleration data, and causes the object to move using the smoothed data. Specifically, the game apparatus 3 calculates the tilt corresponding to the rotation of the controller 7 about the z-axis using the smoothed data, and determines the direction toward which the object moves using the tilt of the controller 7. On the other hand, the game apparatus 3 calculates the up-and-down movement of the controller 7 using the acceleration data so as to determine whether or not the controller 7 is moved upward. When the game apparatus 3 determines that the controller 7 is moved upward, the object is caused to perform a predetermined action such as jumping. Thus, as in the present embodiment and in the horse racing game, by performing one type of operation, that is, the operation of moving the controller 7, one subject to be operated (that is, the object) can be caused to perform two different actions.

Further, two different subjects to be operated can be caused to separately perform actions, as well as one subject to be operated (that is, an object) can be caused to perform two different actions. In other words, the game apparatus 3 can control an action of a first object using the acceleration data, and control an action of a second object, which is different from the first object, using the smoothed data. For example, a game will be described in which speeds of two objects representing runners are controlled. In this game, a player plays the game so as to cause the two objects to run side by side (that is, so as to cause the two objects to have almost the same speed). In such a game, the game apparatus 3 calculates the speed of one object using the acceleration data and calculates the speed of the other object using the smoothed data. When the speed of the object is calculated using the acceleration data, the method described in the present embodiment or the method described for the aforementioned horse racing game can be used. On the other hand, when the speed of the object is calculated using the smoothed data, for example, a method can be used in which the speed of the object is calculated in accordance with an angle at which the controller 7 is tilted from a predetermined reference direction.

As descried above, certain example embodiments can be applied to a game apparatus and a game program so as to, for example, apply multiple states of an input device to a game process in a simplified manner.

While the invention has been described in detail, the foregoing description is in all aspects illustrative and not restrictive. It is understood that numerous other modifications and variations can be devised without departing from the scope of the invention.

The invention claimed is:

1. A game apparatus for executing a game process using acceleration data, the acceleration data outputted by an acceleration sensor of an input device, the game apparatus comprising:
a processing system configured to cause:
receiving the acceleration data;
calculating smoothed data based at least in part on the acceleration data and previously calculated smoothed data, the smoothed data representing a value obtained by smoothing an acceleration represented by the acceleration data; and
executing the game process based at least in part on the acceleration data and the smoothed data.

2. The game apparatus according to claim 1, wherein the game process includes:
determining, using the smoothed data, a state of a player object in a game space for determining a first action to be performed by the player object, and
determining, using the acceleration data, a state of the player object for determining a second action to be performed by the player object.

3. The game apparatus according to claim 2, wherein the state of a player object in the game space for determining the first action includes an attitude of the player object in the game space, and
the state of the player object for determining the second action includes a position of the player object in the game space.

4. The game apparatus according to claim 3, wherein the position of the player object in the game space is based at least in part on a movement distance that is based at least in part on the acceleration data and a moving direction in accordance with the attitude of the player object.

5. The game apparatus according to claim 1, wherein the game process includes:
calculating a difference between a value of the acceleration represented by the acceleration data and the value represented by the smoothed data, and
wherein executing the game process is further based on the difference.

6. The game apparatus according to claim 5, wherein the game process includes:
determining, using the smoothed data, a state of a player object in a game space for determining a first action to be performed by the player object, and
determining, using the difference, a state of the player object for determining a second action to be performed by the player object.

7. The game apparatus according to claim 6, wherein
the state of the player object for determining the first action includes an attitude of the player object in the game, and
the state of the player object for determining the second action includes a position of the player object in the game space.

8. The game apparatus according to claim 7, wherein the position of the player object in the game space is based at least in part on a movement distance that is based at least in part on the difference and by a moving direction in accordance with the attitude of the player object.

9. The game apparatus according to claim 6, wherein the game process includes:
controlling, using the smoothed data, a state of a first player object appearing in the game space for determining an action to be performed by the first player object, and
controlling, using the difference, a state of a second player object appearing in the game space for determining an action to be performed by the second player object.

10. The game apparatus according to claim 1, wherein the game process includes:
controlling, using the smoothed data, a state of a first player object appearing in a game space for determining an action to be performed by the first player object, and
controlling, using the acceleration data, a state of a second player object appearing in the game space for determining an action to be performed by the second player object.

11. The game apparatus according to claim 1, wherein calculating the smoothed data is done each time the acceleration data is received, and wherein the value represented by the smoothed data having been most recently calculated approaches, at a predetermined rate, a value represented by the acceleration data.

12. The game apparatus according to claim 1, wherein the game process includes:
calculating, using the smoothed data, first data corresponding to a tilt of the input device,
calculating, using the acceleration data, second data corresponding to a movement of the input device, and
wherein executing the game process is further based on the first data and the second data.

13. A non-transitory computer-readable storage medium having stored thereon a game program executed by a computer of a game apparatus for executing a game process using acceleration data which is sequentially outputted by an acceleration sensor of an input device, the game program causing the computer to execute:
sequentially acquiring the acceleration data;
sequentially calculating smoothed data based on a value which is obtained by smoothing an acceleration represented by the acceleration data, the smoothed data additionally being calculated based on a previously acquired value of smoothed data; and
executing the game process using the acceleration data and the smoothed data.

14. The storage medium according to claim 13, wherein the game process includes:
determining, using the smoothed data, a state of a player object in a game space for determining a first action to be performed by the player object, and
determining, using the acceleration data, a state of the player object for determining a second action to be performed by the player object.

15. The storage medium according to claim 14, wherein
a state of a player object in a game space for determining the first action includes an attitude of the player object in the game space, and
a state of the player object for determining the second action a position of the player object in the game space.

16. The storage medium according to claim 15, wherein the position of the player object in the game space is based at least in part on the acceleration data and a moving direction in accordance with the attitude of the player object.

17. The storage medium according to claim 13, wherein the game process includes calculating a difference between a value of the acceleration represented by the acceleration data and the value represented by the smoothed data, and
executing the game process further using the difference.

18. The storage medium according to claim 17, wherein the game process includes:
- determining, using the smoothed data, a state of a player object in a game space for determining a first action to be performed by the player object, and
- determining, using the difference, a state of the player object for determining a second action to be performed by the player object.

19. The storage medium according to claim 18, wherein
- a state of a player object in a game space for determining the first action includes an attitude of the player object in the game space, and
- a state of a player object in a game space for determining the second action a position of the player object in the game space.

20. The storage medium according to claim 19, wherein the position of the player object in the game space is based at least in part on a movement distance based on the difference and a moving direction in accordance with the attitude of the player object.

21. The storage medium according to claim 17, wherein the game process includes:
- controlling, using the smoothed data, a state of a first player object appearing in a game space for determining an action to be performed by the first player object, and
- controlling, using the difference, a state of a second player object appearing in the game space for determining an action to be performed by the second player object.

22. The storage medium according to claim 13, wherein the game process includes:
- controlling, using the smoothed data, a state of a first player object appearing in a game space for determining an action to be performed by the first player object, and
- controlling, using the acceleration data, a state of a second player object appearing in the game space for determining an action to be performed by the second player object.

23. The storage medium according to claim 13, wherein
- sequentially calculating smoothed data each time the acceleration data is acquired, and
- calculating the smoothed data further includes performing a calculation by which the value represented by the smoothed data having been most recently calculated approaches, at a predetermined rate, a value represented by the acceleration data.

24. The storage medium according to claim 13, wherein the game process includes:
- calculating, using the smoothed data, first data corresponding to a tilt of the input device including the acceleration sensor,
- calculating, using the acceleration data, second data corresponding to a movement of the input device, and
- executing the game process further using the first data and the second data.

25. A non-transitory computer-readable storage medium having stored thereon a game program executed by a computer of a game apparatus for executing a game process using acceleration data which is sequentially outputted by an acceleration sensor of an input device, the game program causing the computer to execute:
- sequentially acquiring the acceleration data;
- sequentially calculating smoothed data based on a value which is obtained by smoothing an acceleration represented by the acceleration data, the smoothed data additionally based on at least two previously acquired acceleration data; and
- executing the game process using the acceleration data and the smoothed data.

26. A game apparatus for executing a game process using acceleration data, the acceleration data outputted by an acceleration sensor of an input device, the game apparatus comprising:
- a processing system configured to cause:
  - receiving the acceleration data;
  - calculating smoothed data based on at least two previous received acceleration data, the smoothed data representing a value obtained by smoothing an acceleration represented by the acceleration data; and
  - executing the game process based at least in part on the acceleration data and the smoothed data.

27. The game apparatus according to claim 26, wherein the processing system is further configured to calculate the smoothed data based on previously calculated smoothed data and the unsmoothed acceleration data.

28. The game apparatus according to claim 26, wherein the processing system is further configured to calculate the smoothed data based on at least two previous received unsmoothed acceleration data.

29. A game apparatus for executing a game process using acceleration data, the acceleration data outputted by an acceleration sensor of an input device, the game apparatus comprising:
- a processing system configured to:
  - receive unsmoothed acceleration data output by the acceleration sensor;
  - calculate smoothed data representing a value which is obtained by smoothing an acceleration represented by the unsmoothed acceleration data;
  - calculate tilt data from the smoothed data;
  - calculate movement data from the unsmoothed acceleration data; and
  - execute the game process using the smoothed data and the unsmoothed acceleration data, the game process using the tilt data and the movement data to perform first and second game actions of the game process, respectively, the first game action being different from the second game action.

* * * * *